US012784186B1

(12) United States Patent
Njock, II et al.

(10) Patent No.: US 12,784,186 B1
(45) Date of Patent: Nov. 3, 2026

(54) SYSTEM AND METHOD TO INITIATE FOREIGN OBJECT DEBRIS (FOD) REMOVAL PROCEDURES

(71) Applicant: Lockheed Martin Corporation, Bethesda, MD (US)

(72) Inventors: Jean-Pierre Njock, II, Fort Worth, TX (US); Alexander McLean Tramm, Fort Worth, TX (US); Andrew C. Rebeck, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 19/254,383

(22) Filed: Jun. 30, 2025

(51) Int. Cl.
*G06T 7/00* (2017.01)
*H04N 23/50* (2023.01)

(52) U.S. Cl.
CPC ........... *G06T 7/001* (2013.01); *H04N 23/555* (2023.01); *G06T 2207/10068* (2013.01)

(58) Field of Classification Search
CPC .......... G06T 7/001; G06T 2207/10068; H04N 23/555
See application file for complete search history.

(56) References Cited

U.S. PATENT DOCUMENTS 10,184,813 B2 1/2019 Crothers et al.
2008/0247636 A1 10/2008 Davis et al.
2013/0279750 A1 10/2013 Zhou et al.
2014/0375770 A1 12/2014 Habel et al.
2022/0024605 A1 1/2022 Sirmans et al.
2023/0021676 A1 1/2023 Sreejith
2024/0273702 A1 * 8/2024 Tang ......................... G06T 5/50

OTHER PUBLICATIONS

Stephen Oladele, "A Comprehensive Guide on How to Monitor Your Models in Production," [https://neptune.ai/blog/how-to-monitor-your-models-in-production-guide] Jan. 30, 2025, 56 pages.
Alibi Detector KServe Documentation_Website [https://kserve.github.io/website/0.10/modelserving/detect/alibi_detect/alibi_detect/#cifar10-drift-detector], printed from Internet Jun. 27, 2025, 1 page.

(Continued)

*Primary Examiner* — Girumsew Wendmagegn
(74) *Attorney, Agent, or Firm* — Baker Botts L.L.P.

(57) ABSTRACT

A system comprises a sensor communicatively coupled to a processor. The processor is configured to obtain an image data stream from the sensor, determine baseline information from the image data stream, determine that the baseline information comprises the expected content within a threshold tolerance, flag the baseline information as comprising at least one anomaly, electronically extract image data representative of the at least one anomaly from the baseline information, compare the image data representative of the at least one anomaly to acceptable modifications to the expected content, flag at least one anomaly as a Foreign Object Debris (FOD) in response to determining that the image data representative of the at least one anomaly does not match at least one of the acceptable modifications to the expected content, and initiate an FOD removal procedure of the one or more FOD removal procedures.

20 Claims, 5 Drawing Sheets

(56) References Cited

OTHER PUBLICATIONS

Concept—KServe Documentation Website [https://kserve.github.io/website/0.10/modelserving/explainer/explainer/#inferenceservice-explainer], printed from Internet Jun. 27, 2025, 1 page.
Grafana Dashboards—KServe Documentation Website, [https://kserve.github.io/website/0.10/modelserving/observability/grafana_dashboards/], printed from Internet Jun. 27, 2025, 1 page.
Vinicius Trevisan, "Is your ML model stable? Checking model stability and population drift with PSI and CSI," [https://towardsdatascience.com/checking-model-stability-and-population-shift-with-psi-and-csi-6d12af008783/] Mar. 28, 2022, 9 pages.
"Model monitoring overview (beta)," [https://docs.mlrun.org/en/v1.0.0/model_monitoring/model-monitoring-deployment.html#model-drift-analysis] by Iguazio Copyright 2022, Iguazio, 7 pages.
Prometheus Metrics—KServe Documentation Website, "Exposing a Prometheus metrics port," [https://kserve.github.io/website/0.10/modelserving/observability/prometheus_metrics/], printed from Internet Jun. 27, 2025, 3 pages.
Alexander Kirillov et al., "Segment Anything," Meta AI Research, FAIR [https://segment-anything.com/], arXiv:2304.02643v1 [cs.CV] Apr. 5, 2023, 30 pages.
"Statistical Process Control (SPC) Charts: How to Create & Use Them," [https://www.simplilearn.com/spc-charts-article#what_is_statistical_process_control_spc] by Simplilearn, Jun. 9, 2025.
Jean-Pierre Njock II et al. "System and Method to Dynamically Reprovision Removal Devices Configured to Initiate Foreign Object Debris (FOD) Removal Procedures," U.S. Appl. No. 19/254,464, filed Jun. 30, 2025, 62 pages.

* cited by examiner

SYSTEM AND METHOD TO INITIATE FOREIGN OBJECT DEBRIS (FOD) REMOVAL PROCEDURES

TECHNICAL FIELD

The present disclosure relates generally to Foreign Object Debris (FOD) removal procedures in manufacturing areas, and more specifically to a system and method to initiate FOD removal procedures.

BACKGROUND

Foreign object debris (FOD) is a concern on every production line, assembly line, and/or manufacturing line. If left undetected within equipment (e.g., a portion of a vessel, such as an aircraft), FOD may cause severe damage to the structure of the equipment during operations. If left unattended, FOD may be life threatening to operators of certain equipment. During construction, production, or maintenance of the equipment, there are often hard-to-reach areas present in the frame of the equipment where FOD may be located. Conventional scanning methods in production line, assembly line, or manufacturing line often cannot detect FOD in hard-to-reach areas. Further, these conventional scanning methods fail to detect FOD when the FOD includes colors or patterns that are similar to color or patterns in the equipment.

SUMMARY OF THE DISCLOSURE

In one or more embodiments, a system and method are configured to initiate Foreign Object Debris (FOD) removal procedures. In particular, the system may be configured to provision and reprovision devices configured to initiate removal of debris in an area. The debris may be excess materials and/or unexpected objects in production lines, assembly lines, and/or manufacturing lines. To determine whether debris are found in the area, the system may be configured to collect images of the area over a predetermined time duration and dynamically search portions of the images in search for possible discrepancies. To detect a discrepancy in the image, the system is configured to compare portions of the image to known and/or predicted possible appearances of FOD. If a portion of an image matches an image of a known and/or predicted possible appearance of a FOD, an anomaly is detected. In some embodiments, a portion of an image may be a group of pixels and/or points of interest in a given image. After determining that debris are found in the area, the system may be configured to initiate one or more debris removal procedures. The debris removal procedures may comprise clearing the area from debris by washing, sweeping, and/or suctioning the debris among others.

In some embodiments, to determine whether debris and/or any other anomalies are present in the area, the system may be configured to evaluate images collected from the area in accordance with one or more provisioning models. The system may be configured to collect image data using a sensor and evaluate the collected image data for possible anomalies. The system may be configured to determine a baseline information associated with the collected image data and determine whether the baseline information from the collected image includes any discrepancies within a specific threshold. For example, a sampled image may include a fastening element (e.g., a nail or bolt). In the system, a baseline of the image of the fastening element may be determined by identification of the fastening element in the image. The baseline information of the fastening element may be similar to an image of the fastening element previously determined to include a baseline appearance of the fastening element. The image may be a product image provided by a manufacturer of the fastening element. At this stage, the system may be configured to determine whether the collected image including the fastening element is modified within a threshold of the baseline information. Herein, if the collected image is determined to be outside the threshold, the collected image is determined to show an anomaly. A discrepancy in the baseline information may be a color of the fastening element that is outside an expected hue level (e.g., a hue level tolerance). In response to detecting an anomaly, the system may be configured to initiate one or more debris removal procedures where the anomaly is removed from the area.

In some embodiments, actions and/or operations performed in assembly lines, manufacturing lines, and/or production lines may be evaluated, diagnosed, controlled, and/or managed by the system upon execution of one or more artificial intelligence algorithms in accordance with one or more provisioning models. The provisioning models may be artificial intelligence models. The provisioning models may be supervised artificial intelligence models and/or unsupervised artificial intelligence models, among others. The supervised artificial intelligence models may be artificial intelligence models trained to understand and/or predict operations associated with a specific production line profile in a communication network. The unsupervised artificial intelligence models may be trained to understand and/or predict operations associated with general behavior of production lines operating in the communication network. The artificial intelligence models may be implemented in accordance with one or more guidelines, to perform network analyses using one or more neural networks, one or more vision language models (VLMs), and/or one or more large language models (LLMs). The neural networks may be a computing system comprising a network of interconnected nodes, called artificial neurons, to process data in a decentralized manner. The LLMs and the VLMs may be artificial intelligence models that use machine learning to process and generate human language.

In one or more embodiments, the systems described herein are integrated into a practical application of removing debris from production lines, assembly lines, and/or manufacturing lines. Herein, the system inhibits, reduces, and/or eliminates loose material in equipment. Further, the systems are integrated into a practical application of inhibiting and/or eliminating damage to equipment during operations caused by loose debris. Herein, the systems are configured to positively identify debris in assembly lines by scanning areas of equipment being assembled and initiate removal procedures configured to remove the debris. In some embodiments, the systems described herein are integrated into the practical application of dynamically adapting debris identification procedures to account for possible changes in the appearance of debris over time and/or under different manufacturing conditions. In particular, the system may be configured to use an artificial intelligence algorithm in combination with artificial intelligence commands to analyze prior images associated with debris found on assembly bays and/or manufacturing lines to predict likely future appearance of debris in manufacturing lines, assembly lines, and/or production lines. The future appearance of debris may be predicted using the artificial intelligence algorithm and several versions of the predicted appearance may be saved for use during evaluation operations. In this regard, the practical application includes preventing equipment losses in an assembly line as the removal devices are configured to dynamically detect FOD in the equipment prior to embedding the equipment to larger vessels and/or devices.

Technical advantages of this disclosure may include one or more of the following. The system described herein may inhibit, reduce, and/or eliminate an amount of time and/or tooling required to inspect a designated area, remove FOD, seal FOD, and any combination thereof. A borescope of the system may be configured to access hard-to-reach areas about equipment and may be capable of addressing any potential FOD through vacuuming, sealing, mechanically and/or magnetically grabbing, and any combination thereof while the borescope and/or camera remains in position.

In one or more embodiments, the systems may comprise an apparatus, such as the server. Further, the system may be a data exchange system, which comprises the apparatus. In addition, the system may be configured to perform operations as part of a process performed by the apparatus. As a non-limiting example, the system may comprise a sensor and at least one processor communicatively coupled to one another. The sensor may be configured to collect data associated with one or more portions of an apparatus. The processor may be configured to obtain an image data stream from the sensor. The image data stream may comprise one or more image frames representative of a portion of the apparatus. The processor may be configured to receive manufacture information of the apparatus, electronically associate expected content of the portion of the apparatus based at least in part upon the manufacture information in response to receiving the manufacture information of the apparatus, and determine baseline information from the image data stream. The baseline information may be representative of a plurality of static portions in the image data stream.

Further, the processor may be configured to determine whether the baseline information comprises the expected content within a threshold tolerance, flag the baseline information as comprising at least one anomaly in response to determining that the baseline information does not comprise the expected content within the threshold tolerance, electronically extract image data representative of the at least one anomaly from the baseline information, compare the image data representative of the at least one anomaly to a plurality of acceptable modifications to the expected content, and determine whether the image data representative of the at least one anomaly matches at least one of the plurality of acceptable modifications to the expected content, and flag at least one anomaly as a Foreign Object Debris (FOD) in response to determining that the image data representative of the at least one anomaly does not match at least one of the plurality of acceptable modifications to the expected content. The processor may be configured to generate a visual report comprising the at least one anomaly identified in the one or more image frames representative of the portion of the apparatus, present the visual report and one or more FOD removal procedures and initiate an FOD removal procedure of the one or more FOD removal procedures configured to remove the FOD from the portion of the apparatus.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and corresponding advantages are best understood by referring to FIGS. 1 through 5, where like numbers are used to indicate like and corresponding parts.

As described, Foreign Object Debris (FOD) may be present in equipment and/or vessels. Detection and/or removal of the FOD from the equipment and/or vessels may inhibit, prevent, and/or eliminate potential damage during operations of the equipment and/or vessels. Described herein are various systems and methods that provide an improvement in detection, removal, sealing, and combinations thereof by using an inspection system.

Figure 1:
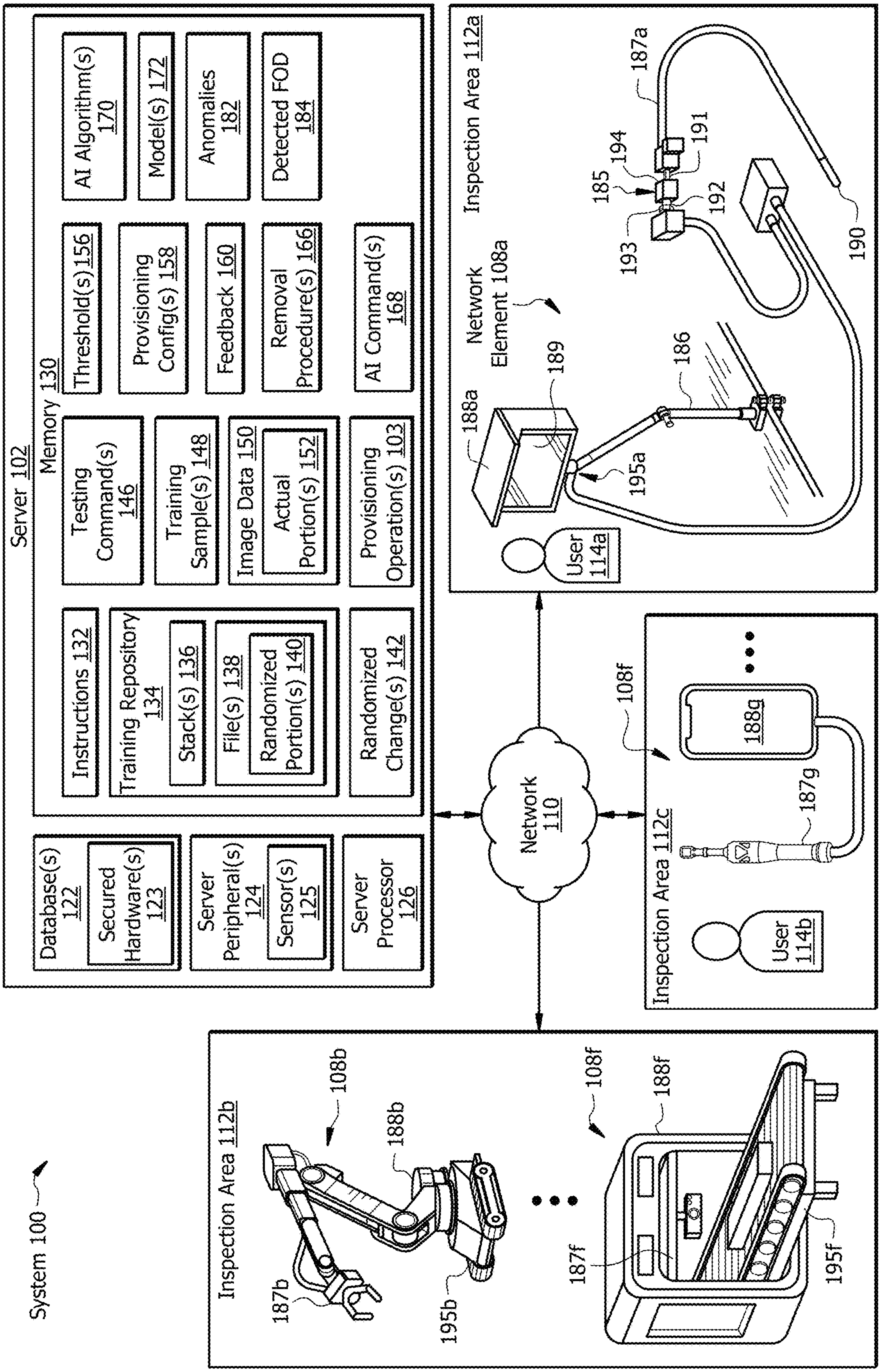
FIG. 1 illustrates an example inspection system, according to certain embodiments.
Figure 2:
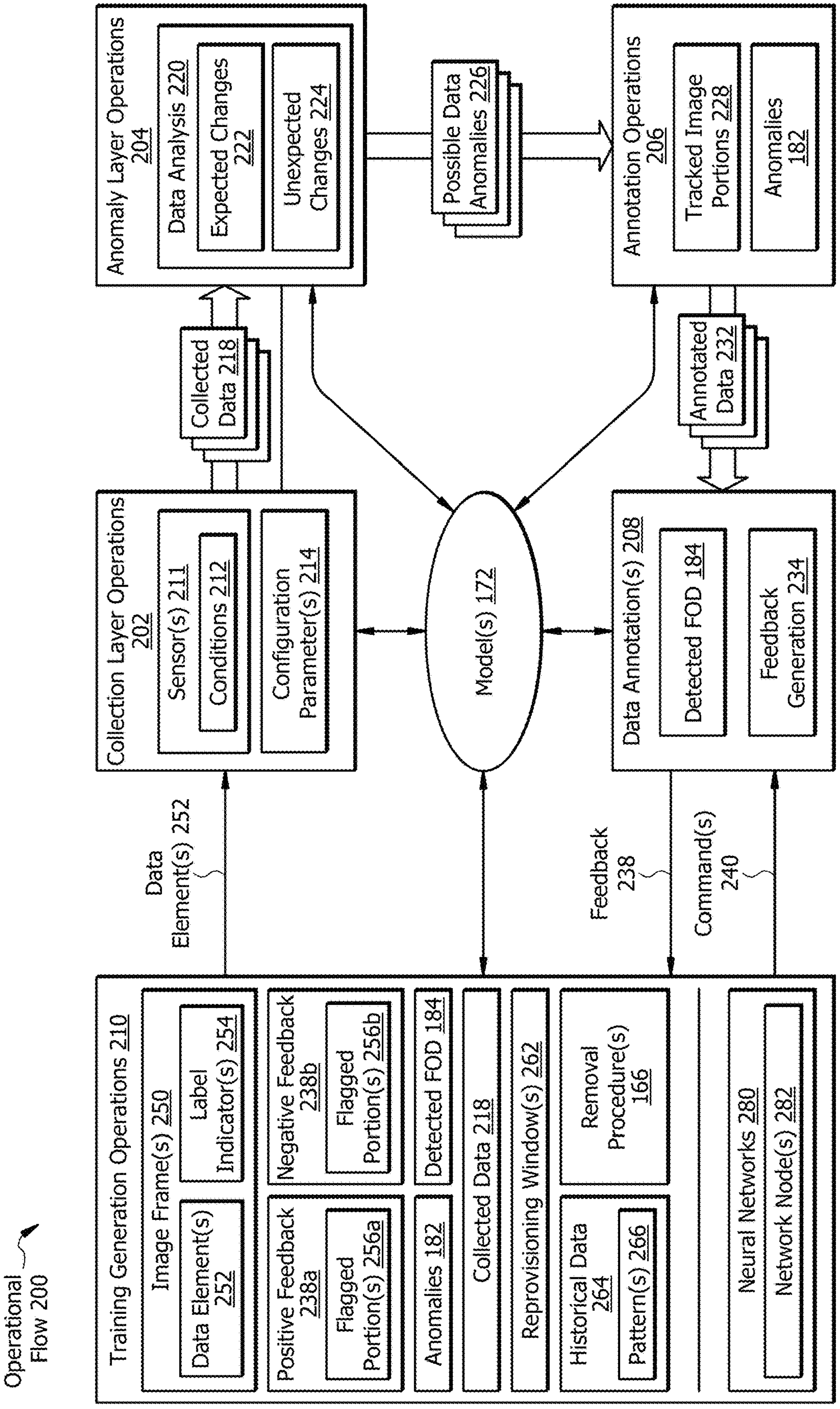
FIG. 2 illustrates an operational flow configured to dynamically reprovision devices configured to initiate Foreign Object Debris (FOD) removal procedures in accordance with one or more embodiments.
Figure 3:
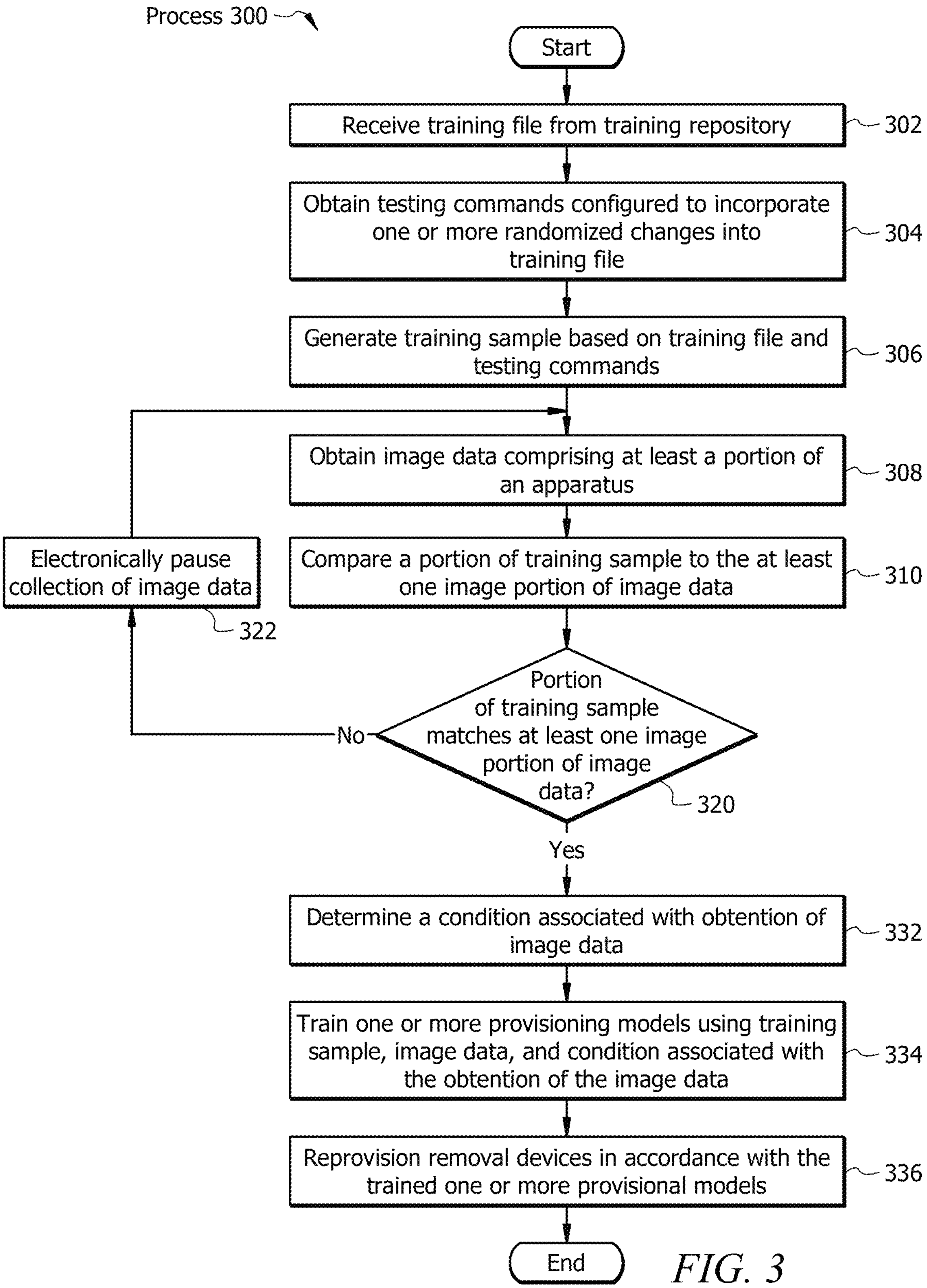
FIG. 3 illustrates an example flowchart of a method to dynamically reprovision removal devices following the operational flow of FIG. 2 in accordance with one or more embodiments.
Figure 4:
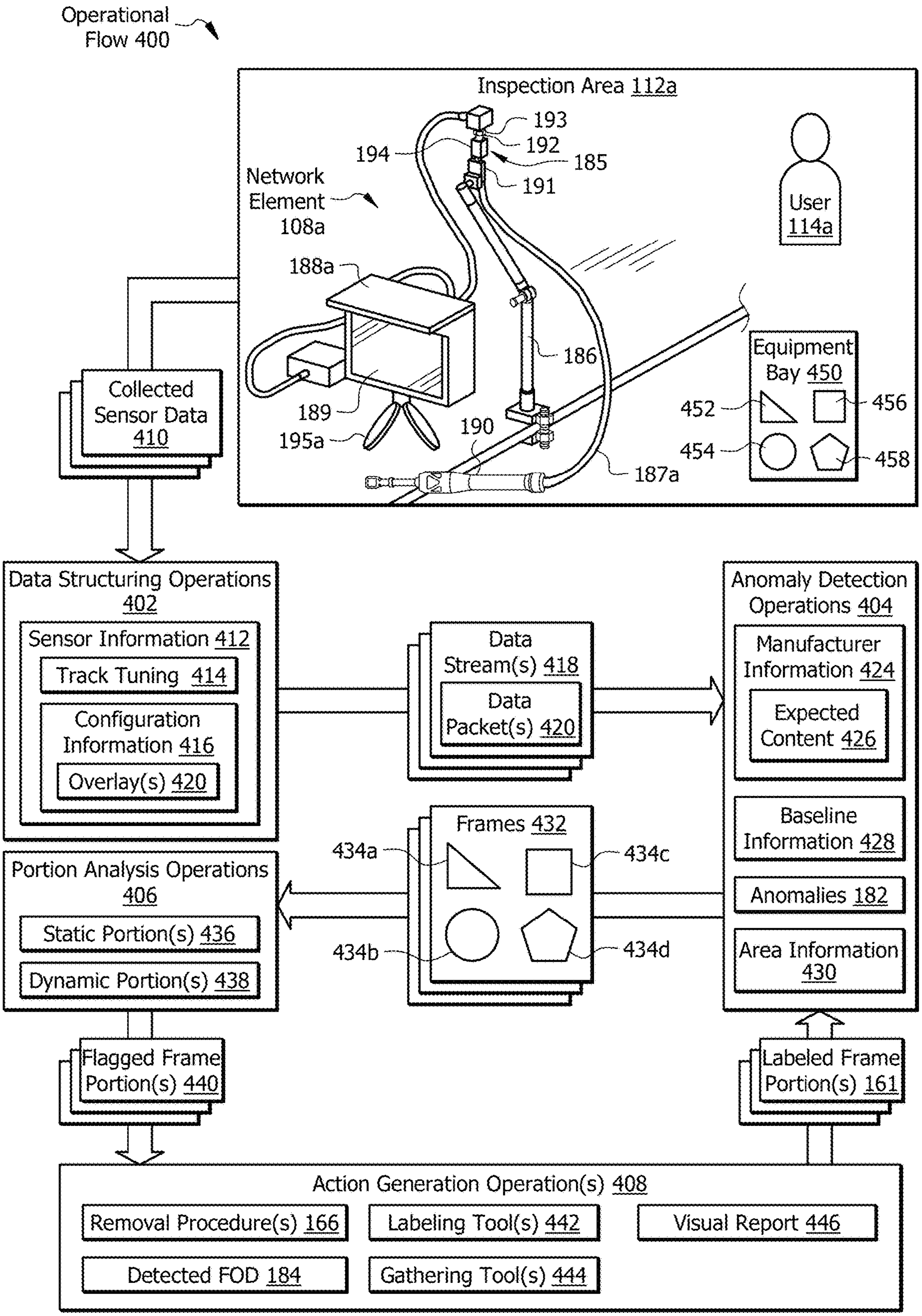
FIG. 4 illustrates an operational flow configured to initiate FOD removal procedures in accordance with one or more embodiments.
Figure 5:
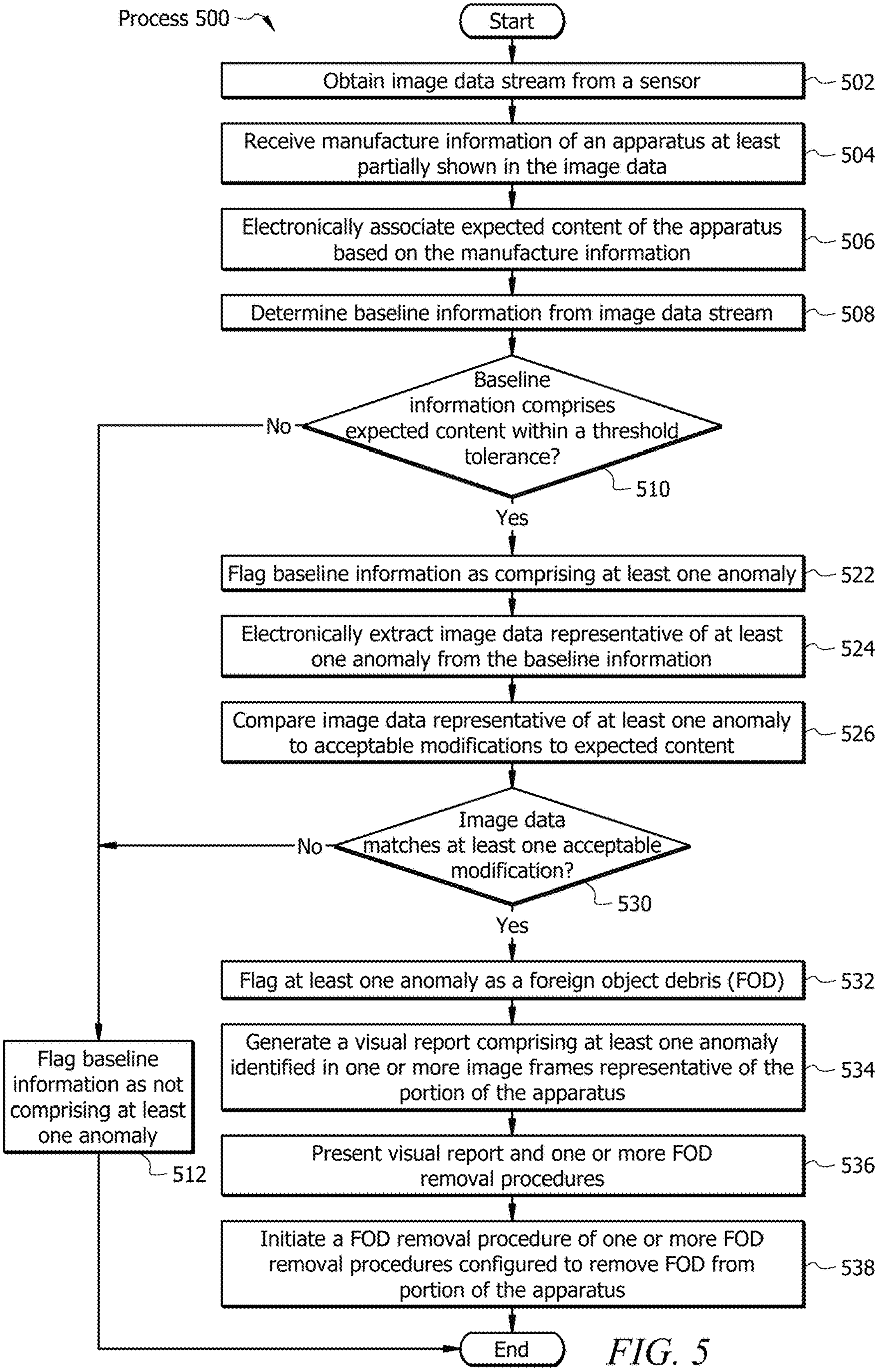
FIG. 5 illustrates an example flowchart of a method to initiate FOD removal procedures following the operational flow of FIG. 4 in accordance with one or more embodiments.

FIG. 1 illustrates a system 100 in which a server 102 is configured to reprovision one or more network elements 108. FIG. 2 illustrates an operational flow 200 performed by the system 100 of FIG. 1. FIG. 3 illustrates a process 300 in which the operational flow 200 of FIG. 2 is performed. FIG. 4 illustrates an operational flow 400 performed by the system 100 of FIG. 1. FIG. 5 illustrates a process 500 in which the operational flow 400 of FIG. 4 is performed.

System Overview

FIG. 1 illustrates an example system 100, in accordance with one or more embodiments. The system 100 may comprise a server 102 configured to perform one or more reprovisioning operations 103. The system 100 includes a server 102 communicatively coupled to a network element **108*a*, a network element 108*b*, a network element 108*f*, and a network element 108*g* (collectively, network elements 108) via a network 110. The network elements 108 may be inspection devices configured to scan and/or inspect areas and/or spaces in an environment. The network elements 108 may be configured to perform one or more network element operations with each other and/or with the server 102 via the network 110. The network elements 108 may be working nodes configured to receive instructions to perform one or more network element operations based on instructions received from the server 102. The network elements 108** may be one or more physical devices that store application information (e.g., service configurations) and data associated with one or more operations performed in an environment and/or location. The network element 108 may be configured to evaluate one or more aspects of image data collected from one or more areas adjacent and/or neighboring the network elements 108. In some embodiments, some of the network elements 108 may be clustered together in one or more inspection areas 112 (e.g., shown as an inspection area 112*a*, an inspection area 112*b*, and an inspection area 112*c*). Each of the network elements 108 may be associated with one or more corresponding operators. These operators are shown as a user 114*a* and a user 114*b* (collectively, users 114) in the inspection areas 112. In FIG. 1, the inspection area 112*a* is shown comprising the user 114*a* associated with the network element 108*a*. The inspection area 112*c* is shown comprising the user 114*b* associated with the network element 108*g*.

In one or more embodiments, the server 102 may comprise one or more databases 122 associated with secured hardware 123, one or more server peripherals 124, one or more server processors 126, and at least one memory 130 communicatively coupled to one another. In some embodiments, the memory 130 may comprise instructions 132, at least one training repository 134 comprising one or more stacks 136 and one or more files 138 comprising one or more randomized portions 140, one or more randomized changes 142, one or more testing commands 146, one or more training samples 148, image data 150 comprising one or more actual portions 152, one or more thresholds 156, one or more provisioning configurations 158, feedback 160, the one or more reprovisioning operations 103, one or more removal procedures 166, one or more artificial intelligence (AI) commands 168, one or more AI algorithms 170 configured to train and/or perform one or more operations in accordance with one or more models 172, one or more anomalies 182, and one or more detected FOD 184.

Referring to the network element 108*a* as a non-limiting example, the network element 108*a* may be an inspection system including a borescope 187*a*, a mounting system 186, an articulation system 185, and a controller 188*a*. The borescope 187*a* may be communicatively coupled to the controller 188*a*. The network element 108*a* may be configured to include a mounting system 186, a display 189, a proximal end 191, a first rotating lever 192, second rotating lever 193, a handle 194, and a mobility system 195*a*. As shown in the network element 108*b*, the network element 108*f*, and the network element 108*g*, there may be one or more embodiments of the network elements 108. In some embodiments, one or more optical fibers may be disposed within a tubular and may connect a distal end 190 of the borescope 187*a* to the controller 188*a*, where an optical device may be disposed at the distal end 190 of the borescope 187*a*.

System Components

Server

The server 102 is generally any device or apparatus that is configured to process data and communicate with computing devices (e.g., the network elements 108), additional databases, systems, and the like, via the one or more server peripherals 124 (i.e., a user interface or a network interface). The server 102 may comprise the server processor 126 that is generally configured to oversee operations of the processing engine. The operations of the processing engine are described further below in conjunction with the system 100 described in FIG. 1, the operational flow 200 described in FIG. 2, the process 300 described in FIG. 3, the operational flow 400 described in FIG. 4, and the process 500 described in FIG. 5.

The server 102 comprises multiple databases 122 configured to provide one or more memory resources to the server 102 and the network elements 108. The server 102 comprises the server processor 126 communicatively coupled with the databases 122, the server peripherals 124, and the memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to store one or more secured data elements and/or data records. The databases 122 may be one or more physical environments comprising secured hardware configured to encrypt and/or safeguard information stored in the databases 122.

In one or more embodiments, the server peripherals 124 may be configured to enable wired and/or wireless communications. The server peripherals 124 may be configured to communicate data between the server 102 and network elements 108 (i.e., cart and wand embodiment, robotic arm environment, conveyor analyst embodiment, and/or handheld device embodiment in the network 110), systems, or domain(s) via the network 110. For example, the server peripherals 124 may comprise a wireless network protocol interface, a local area network (LAN), a metropolitan area network (MAN), a wide area network (WAN), a modem, a switch, or a router. The server processor 126 may be configured to send and receive data using the server peripherals 124. The server peripherals 124 may be configured to use any suitable type of communication protocol. In some embodiments, the server peripherals 124 may be an admin console comprising a display configured to show a user interface used to manage a middleware server domain via the server 102.

The at least one server processor 126 may comprise one or more processors communicatively coupled to the memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), Graphics processing units (GPUs), or digital signal processors (DSPs). The server processor 126 may be a programmable logic device, a microcontroller, a microprocessor, or any suitable combination of the preceding. The one or more server processors 126 may be configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the memory 130 and executes the instructions 132 by directing the coordinated operations of the ALU, registers and other components. In this regard, the one or more server processors 126 are configured to execute various instructions. For example, the one or more server processors 126 are configured to execute the instructions 132 to implement the functions disclosed herein, such as some or all of those described with respect to FIGS. 1-5. In some embodiments, the functions described herein are implemented using logic units, FPGAs, ASICs, DSPs, or any other suitable hardware or electronic circuitry.

In one or more embodiments, the server peripherals 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server peripherals 124 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the at least one training repository 134 comprising the one or more stacks 136 and the one or more files 138 comprising the one or more randomized portions 140, the one or more randomized changes 142, the one or more testing commands 146, the one or more training samples 148, the image data 150 comprising the one or more actual portions 152, the one or more thresholds 156, the one or more provisioning configurations 158, the feedback 160, the one or more reprovisioning operations 103, the one or more removal procedures 166, the one or more AI commands 168, the one or more AI algorithms 170 configured to train and/or perform the one or more operations in accordance with the one or more models 172, the one or more anomalies 182, and the one or more detected FOD 184. The instructions 132 may comprise any suitable set of instructions, logic, rules, or code operable to execute the server processor 126.

In one or more embodiments, one or more of the operations performed by the server 102 may be at least partially performed by one or more of the network elements 108. For example, while certain data elements and/or data records shown as being stored in the memory 130 of the server 102, network element memories communicatively coupled with corresponding controllers 188 in the network elements 108 may be configured to store one or more of the same data elements and/or data records. In another example, while certain operations are described herein as being performed by the server processor 126 of the server 102, the controllers 188 in the network elements 108 may be configured to perform one or more of the same operations.

In one or more embodiments, the anomalies 182 may be one or more discrepancies determined and/or identified in images collected from an inspection area 112. The anomalies 182 may be one or more pieces of material and/or debris in the inspection area 112. The inspection areas 112 may be one or more spaces where equipment is built, assembled, and/or produced. The anomalies 182 may be one or more loose debris in a bay and/or a container including the equipment. In some embodiments, the anomalies 182 may be FOD when debris is not expected to be in the inspection area 112 and/or is determined to cause adverse impacts to the equipment. The detected FOD 184 may be FOD that is detected in one of the inspection areas 112.

The training repository 134 may be part of the one or more databases 122. The training repository 134 may be a standalone data repository and/or a partition in the memory 130. The training repository 134 may be operable to store one or more information stacks 136, and one or more training files 138 representative of one or more outputs of the information stack 136. The training files 138 may be one or more images representative of one or more representative aspects of possible changes in the appearance of an inspection area 112 and/or equipment in the inspection area 112. The training files 138 may be images comprising multiple randomized portions 140. The information stack 136 may be one or more data elements and/or data records stored in accordance with a specific order. The one or more stacks 136 may be dynamically arranged and/or periodically modified to include images showing newer possible appearances of debris. In some embodiments, the training files 138 may include one or more randomized portions 140 generated using one or more AI commands 168 and one or more AI algorithms 170 in accordance with one or more AI models 172. The randomized portions 140 may be portions (e.g., individual pixels and/or group of pixels) in the training files 138. The randomized portions 140 may be one or more portions that are modified, rotated, cropped, expanded, and/or altered in accordance with one or more modifications. The modifications may be one or more changes made to one or more objects included in the portions. The objects may be hardware associated with one or more equipment being produced, assembled, and/or manufactured in the inspection areas 112. For example, the objects may be bolts, nails, spacers, and the like.

The randomized changes 142 may be one or more modifications to images and/or image data 150 performed by the server 102 and/or one or more of the network elements 108. The randomized changes 142 may be one or more modifications that alter one or more parameters of an object randomly in accordance with guidelines established via the models 172. In this regard, while implemented randomly, the randomized changes 142 may be one or more changes listed in a stack 136 of possible changes. The randomized changes 142 may be randomized in one of the stacks 136 and retrieved for application in a successive order. The randomized changes 142 randomized after multiple changes are retrieved from a stack 136. The randomized changes 142 may be one or more applied to alterations and/or modifications to images and/or portions of images collected from the inspection areas 112. The randomized changes 142 may be one or more applied to alterations and/or modifications to images and/or portions of images representative of debris that may be found in the inspection areas 112. The randomized changes 142 may be one or more applied to alterations and/or modifications to images and/or portions of images representative of objects generally found in equipment in the inspection areas 112.

The testing commands 146 may be one or more sampling and/or proving parameters configured to guide evaluation and/or analyses related to collected images. The testing commands 146 may be one or more sampling and/or proving parameters configured to guide evaluation and/or analyses related to training files 138. In some embodiments, the testing commands 146 may be configured to inform rules, conditional parametrization, and/or policies associated with one or more operations performed by the server 102 and/or the network elements 108. The testing commands 146 may be one or more controls and/or triggers configured to cause the server processor 126 and/or the controllers 188 to perform one or more specific operations. In some embodiments, the testing commands 146 may be configured to incorporate one or more randomized changes 142 into a specific training file 138.

The training samples 148 may be modified versions of one or more randomized portions 140 of the training files 138. A training sample 148 may be generated by retrieving a training file 138 from the training repository 134 and modifying one or more portions of the training file 138 in accordance with one or more randomized changes 142 to modify one or more corresponding randomized portions 140.

The image data 150 may be one or more images collected from an inspection area 112. The image data 150 may be one or more representations of an image. The image data 150 may include a specific format. The image data 150 may be in infrared image capture, a black and white image capture, a thermodynamic image capture, and/or a live image capture and the like. The image data 150 may comprise one or more actual portions 152. The actual portions 152 may be one or more pixels and/or group of pixels. The actual portions 152 may be one or more aspects of the image data 150 configured to demonstrate one or more real aspects of the inspection areas 112. The image data 150 may be data collected from using one or more specialized sensors to inspect and/or scan the inspection areas 112.

The thresholds 156 may be one or more tolerances configured to provide a limit and/or pause trigger to an operation. The thresholds 156 may be one or more specific numbers and/or number ranges associated with a specific parameter and/or indicator. The one or more thresholds 156 may be a specific value representing a higher boundary or a lower boundary. The one or more thresholds 156 may be one or more threshold ranges comprising higher boundaries and lower boundaries. The one or more thresholds 156 may be a percentage value representing a similarity and/or a difference between one or more values assigned as tolerances for current configuration parameters, one or more reference data element values, and/or one or more reference data record values. The one or more thresholds 156 may be determined based on information associated with the requests. The one or more thresholds 156 may be determined dynamically over time. The one or more thresholds 156 may be predefined and/or predetermined in accordance with information in activity associated with one or more of the requests. In some embodiments, the server 102 and/or the network elements 108 may be configured to calculate the one or more thresholds 156 based on information obtained via the server peripherals 124 in the server 102 and/or the borescope 187 (or optical capture devices) in the network elements 108. In one or more embodiments, the borescope 187 may further comprise an optical device and/or sensor, such as a camera, and a plurality of optical fibers. In these embodiments, the plurality of optical fibers may be disposed within the tubular and may connect a distal end 190 of the borescope 187 to the controller 188, wherein the optical device may be disposed at the distal end 190 of the borescope 187. The one or more thresholds 156 may be the same for multiple managed servers 145. The one or more thresholds 156 may be unique for each time image data 150 is collected.

The one or more provisioning configurations 158 may be one or more indicators configured to provide information associated with collection of image data 150 from the sensors. The one or more provisioning configurations 158 may be stored in one or more formats. The provisioning configurations 158 may be configured to generate one or more access commands based on feedback 160. In this regard, the access commands may be information indicating modifications and/or assignments of resources to the network elements 108 during collection of the image data 150. The access commands may be replaced, updated, and/or modified dynamically. The access commands may comprise results of one or more operations of the processing engine configured to perform one or more of the reprovisioning operations 103. The access commands may be one or more triggers configured to collection of the image data 150.

The one or more provisioning configurations 158 may be configured to instruct and/or trigger provisioning aspects and/or reprovisioning aspects of one or more servers and/or one or more network elements 108. The provisioning aspects and/or reprovisioning aspects may control and/or regulate one or more collection operations of image data 150 in one or more inspection areas 112. The provisioning aspects may be one or more provisioning associated with a new network element 108 and/or a network element 108 positioned to inspect an inspection area 112. The reprovisioning aspects may be one or more provisioning associated with a device previously provisioned using provisioning aspects and/or other reprovisioning aspects. The provisioning configurations 158 may be one or more configuration parametrization for one or more one or more network elements 108. The provisioning configurations 158 may instruct operation arrangements of one or more operations in the network elements 108 over a period of time.

The feedback 160 may comprise data, metadata, and one or more reports. The feedback 160 may comprise information provided by and/or obtained from the network elements 108 during one or more communication operations. The network elements 108 may be configured to perform one or more collection operations configured to determine baseline data and/or metadata from the communication operations and generate one or more reports associated with interactions of the network elements 108 in the network 110. The feedback 160 may be collected and/or obtained continuously and/or periodically over time by one or more of the network elements 108. The feedback 160 may be provided continuously and/or periodically over time from one or more of the network elements 108 to the server 102. The feedback 160 may be data indicating whether any of the network elements 108 are collected at any point in time. The feedback 160 may be obtained via one or more of sensor elements in the borescope 187. The feedback 160 may comprise multiple data samples. Each data sample may comprise a format and a size. The feedback 160 may be configured to indicate one or more conditions associated with the collection of the image data 150. The feedback 160 may indicate one or more elements in the actual portions 152 of the image data 150. The metadata may be data that represents extracted information and/or summarized information associated with one or more actual portions 152 in image data 150 collected by the network elements 108. In the example of FIG. 1, the baseline data and/or metadata may be active information comprising business metadata and/or passive information comprising technical metadata. The active information may be metadata used by one of the applications and may be dynamic in nature. The passive information may be metadata collected from the applications during one or more application operations and may be static in nature. In one or more embodiments, the one or more reports may include one or more communications and/or transmissions configured to provide information relating to a status of one or more collection operations. The reports may comprise and/or trigger alerts associated with one or more of the network elements 108.

The reprovisioning operations 103 may be executed by the server processor 126 configured to enable data objects comprising one or more data elements to be exchanged between the server 102, the network elements 108, and/or one or more additional devices communicatively coupled to the server 102 and/or the network elements 108. In one or more embodiments, the reprovisioning operations 103 may be configured to indicate one or more data objects (e.g., via data object information) to be exchanged between the server 102 and at least one of the network elements 108. The data exchange operations may be configured to generate and analyze one or more requests and/or one or more reports. The reports may comprise data indicating warnings and alerts among other information. In some embodiments, the reports may be audio and/or visual signaling presented in the one or more server peripherals 124. The one or more requests may be one or more communications configured to provide triggers in the form of communication or control signals to start operations such as fetching the instructions 132 or running one or more of data exchange operations.

In one or more embodiments, the reprovisioning operations 103 may be one or more operations performed by the network elements 108. The reprovisioning operations 103 may be one or more operations comprising multiple stages and/or transitions at different network elements 108.

The reprovisioning operations 103 may be one or more one or more commands and/or guidelines configured to inform configurations and/or settings in a network element 108 and/or one or more servers communicatively coupled with specific network elements 108. The reprovisioning operations 103 may comprise one or more instructions to purchase, order, construct, and/or assemble equipment in a network element 108 and/or a specific portion of the network element 108.

The removal procedures 166 may be one or more operations that include removing debris from the equipment in an inspection area 112. The removal procedures 166 may include filling the space with the detected FOD 184 with air, water, and/or another liquid. Further, the removal procedures 166 may include one or more sealing operations in which the FOD is sealed and disposed away from the equipment. The removal procedures 166 may include one or more operations in which equipment determined to include debris is inspected for additional anomalies 182 and/or FOD.

In one or more embodiments, the AI algorithms 170 may be executed by the server processor 126 to implement and/or perform the provisioning operations 103. Further, the AI algorithms 170 may be configured to interpret and transform the requests and/or the instructions 132 into structured data sets and subsequently stored as files or tables. The AI algorithms 170 may cleanse, normalize raw data, and derive intermediate data to generate uniform data in terms of encoding, format, and data types. The AI algorithms 170 may be executed to run user queries and advanced analytical tools on the structured data and/or the unstructured data in accordance with one or more models 172. The AI algorithms 170 may be configured to generate the one or more AI commands 168 based on one or more results of the provisioning operations 103 and/or one or more collection operations. The AI commands 168 may be parameters that proactively trigger one or more of the provisioning operations 103 and/or one or more collection operations. The AI commands 168 may be combined with the existing instructions 132 to dynamically trigger and/or perform one or more data authentication operations, the provisioning operations 103, and/or one or more collection operations. The AI commands 168 may be configured to trigger one or more cognitive AI operations in accordance with one or more models 172. The models 172 may be trained by the one or more AI algorithms 170 based on historic information associated with any collection operations, analysis operations, and/or reprovisioning operations 103 performed by the network elements 108 and/or the server 102.

In one or more embodiments, the databases 122 may be one or more repositories configured to store information. In one example, the server 102 may determine whether the server processor 126 is available (e.g., running) to perform a specific service. In another example, the server 102 may determine that a specific managed server is running to enable a testing application and/or perform the specific service upon receiving a server response indicating that a corresponding managed server is available to perform the service. The databases 122 may be configured to store one or more representations of data instead of storing coded data. In this regard, the representations may be encoded in accordance with an encoder configured to identify and/or verify exchanged information. For example, the databases 122 may comprise one or more representations of the feedback 160. As the feedback 160 is obtained, the server processor 126 may be configured to process the feedback 160 in accordance with one or more operations triggered and/or caused upon execution of the AI algorithm 170.

Network

The network 110 facilitates communication between and amongst the various devices of the system 100. The network 110 may be any suitable network operable to facilitate communication between the server 102 and the network elements 108 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Removal Devices

In one or more embodiments, the network elements 108 may be one or more physical removal devices that store application information (e.g., service configurations) and data associated with one or more operations performed in the communication network. The network elements 108 may be devices configured to inspect one or more inspection areas 112 where computing and networking equipment in the network element 108 is used to collect, process, and store image data 150, as well as to distribute and enable access to collection operations and/or analysis operations. In some embodiments, the server 102 may be located in one or more of the network elements 108.

In embodiments, the network elements 108 may be an inspection system comprising a borescope 187, a mounting system 186, an articulation system 185, and a controller 188. In one or more embodiments, the borescope 187 may be configured to maneuver about and around areas that are small and/or difficult to access. The borescope 187 may be any suitable size, height, shape, and combinations thereof. In embodiments, the borescope 187 may comprise a tubular, wherein the tubular has an elongated, cylindrical shape. The borescope 187 may comprise any suitable materials. Without limitations, the suitable materials may be metals, nonmetals, polymers, composites, and any combinations thereof. In embodiments, the borescope 187 may be rigid, flexible, or a combination thereof. In certain embodiments, a portion of the borescope 187 may be flexible while the remaining portion of the borescope may be rigid.

As a first example, the network element 108*a* may be a removal device and/or an inspection device configured to inspect an inspection area 112*a*. The network element 108*a* may be configured to be attached and/or fastened to a surface. The network element 108*a* may be configurable to be carried, lifted, and/or moved around the inspection area 112*a*. In some embodiments, the borescope 187*a* is connected directly to the controller 188*a* and the display 189 may be attached to the mounting system 186. Further, the network element 208*a* may be contained within a cart, with the controller 188*a* inside the cart on a bottom with the mounting system 186 holding up the display 189 on a top part of the cart. Further, the borescope 187*a* may be placed in a shadowbox on top of the cart (e.g., in front of the mounting system 186).

In the network element 108*a*, a proximal end 191 of the borescope 187*a* may be coupled to the mounting system 186. In embodiments, the mounting system 186 may be configured to secure the network elements 108 to an external surface. Without limitations, the mounting system 186 may comprise any suitable components, such as tubulars, rods, clamps, hinges, fasteners, and the like. In embodiments, the mounting system 186 may be adjustable to secure the network elements 108 at any suitable distance and/or angle to the external surface. The mounting system 186 may be any suitable size, height, shape, and combinations thereof. The mounting system 186 may further comprise any suitable materials. Without limitations, the suitable materials may be metals, nonmetals, polymers, composites, and any combinations thereof. In embodiments, the mounting system 186 may be coupled to the articulation system 185.

The articulation system 185 may be configured to actuate the borescope 187*a*. In one or more embodiments, the articulation system 185 may comprise a first rotating lever 192, a second rotating lever 193, and a handle 194. The first rotating lever 192 may be configured to actuate a portion of the borescope 187*a* about the distal end 190 to bend along a horizontal plane with respect to the distal end 190. In embodiments, the second rotating lever 193 may be configured to actuate the portion of a borescope 187*a* about the distal end 190 to bend along a vertical plane with respect to the distal end 190. In one or more embodiments, the portion of the borescope 187*a* about the distal end 190 may have any suitable length necessary to operate in small areas within or about a vessel (e.g., an aircraft) and/or assembling equipment. Without limitations, the length of the portion of the borescope 187*a* about the distal end 190 may be from about 1 inch to about 3 inches, from about 3 inches to about 5 inches, from about 5 inches to about 10 inches, and any combination thereof. In embodiments, the portion of the borescope 187*a* about the distal end 190 may have a length of about 5 inches. The portion of the borescope 187*a* about the distal end 190 may bend to form no greater than about a 120° angle with reference to the initial position of the distal end 190. Without limitations, the portion of the borescope 187*a* about the distal end 190 may form an angle of about 0.5° to about 45°, about 45° to about 90°, about 90° to about 120°, or any combination thereof with the initial position of the distal end.

In one or more embodiments, the first rotating lever 192 and/or the second rotating lever 193 may be actuated manually or automatically via a controller 188*a*. In embodiments, the first rotating lever 192 and the second rotating lever 193 may be actuated to move the portion of the borescope 187*a* about the distal end 190 at the same time and/or at different times. The first rotating lever 192 and the second rotating lever 193 may be any suitable size, height, shape, and combinations thereof. In embodiments, the first rotating lever 192 and the second rotating lever 193 may have the same dimensions. In other embodiments, the first rotating lever 192 and the second rotating lever 193 may have different dimensions.

In one or more embodiments, the first rotating lever 192 and the second rotating lever 193 may be disposed adjacent to the handle 194. In these embodiments, the proximal end 191 of the borescope 187*a* may be attached to the handle 194, and the first rotating lever 192 and the second rotating lever 193 may be disposed at an opposite side of the handle 194 from the proximal end 191. In embodiments, the handle 194 may be configured to be physically manipulated by an operator when operating the network elements 108. The handle 194 may be any suitable size, height, shape, and combinations thereof. The handle 194 may comprise any suitable materials. Without limitations, the suitable materials may be metals, nonmetals, polymers, composites, and any combinations thereof.

As illustrated, the handle 194 may be communicatively coupled to the controller 188*a*. In one or more embodiments, the controller 188*a* may be configured to operate the network elements 108 or individual components within the network elements 108. During operations the controller 188*a* may control the movement and operation of the borescope 187*a*. In one or more embodiments, the controller 188*a* may include one or more interface(s), processing circuitry, memory(ies), and/or other suitable element(s). In embodiments, an interface receives input, sends output, processes the input and/or output, and/or performs other suitable operation. Interface may comprise hardware and/or software. In embodiments, the controller 188*a* may further comprise a display 189, wherein the display 189 may be configured to display information obtained by the network elements 108 to an operator, and wherein the operator may be able to control certain functions of the network elements 108 through the display 189. Without limitations, the operator may take pictures or record video, control the lights disposed about the borescope 187*a*, access stored pictures and/or videos, control connectivity to a communication network, and any combinations thereof through the display 189.

Processing circuitry performs or manages the operations of the component. Processing circuitry may include hardware and/or software. Examples of a processing circuitry include one or more computers, one or more microprocessors, one or more applications, cloud computing and/or server computing and the like. In certain embodiments, processing circuitry executes logic (e.g., instructions 132) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, a cover plate may be disposed at the distal end 190. The cover plate may seal the interior of the borescope 187*a* and secure further components at the distal end 190. The cover plate may be any suitable size, height, shape, and configurations thereof. In embodiments, the cover plate may have a circular cross-section having a diameter slightly larger than the outer diameter of the borescope 187*a*, wherein there is at least a 1% to about a 5% tolerance between the cover plate and the borescope 187*a*. Without limitations, the cover plate may be attached to the distal end 190 by any suitable means, including suitable fasteners, adhesives, threading, welding, brazing, and any combination thereof.

The cover plate may comprise one or more lights, one or more sensors, and a working channel. In some embodiments, any suitable lights may be used. In one or more embodiments, the lights may be configured to project and supply light to a designated area for inspection via the borescope 187*a*. In embodiments, the lights may be any suitable size, height, shape, and combinations thereof. The lights may be disposed in the cover plate. In certain embodiments, there may be at least one of the lights disposed in the cover plate. The lights may be disposed about any suitable location and configuration in the cover plate. The lights may be disposed about different portions of the cover plate. In embodiments, the lights may be electrically coupled to the controller 188*a* through the use of any suitable wiring, wherein the wiring may be disposed within the interior of the borescope 187*a*.

The sensors may be disposed in the cover plate near the lights. In embodiments, the sensors may be disposed about any suitable location in the cover plate. The sensors may generally be disposed between the lights but offset by a certain distance. In embodiments, the sensors may be any suitable size, height, shape, and combinations thereof. In embodiments, any suitable camera may be used for sensors. In one or more embodiments, the sensors may be configured to record, capture, visually display, and combinations thereof information within a designated area for inspection via the borescope 187*a*. In embodiments, the sensors may be electrically coupled to the controller 188*a* through the use of any suitable wiring (for example, fiber optic cables), wherein the wiring may be disposed within the interior of the borescope 187*a*. During operations, as the sensors operate, the display 189 may visually display information, images, video, and the like to an operator (e.g., one of the users 114). In one or more embodiments, the operator may further utilize the working channel to address any potential FOD discovered in images collected by the sensors.

The working channel may be disposed in the cover plate near the lights. In embodiments, the working channel may be disposed about any suitable location in the cover plate. The working channel may generally be disposed between the lights but offset by a certain distance and opposite to the sensors. In other embodiments, the working channel may be disposed about a center of the cover plate, and the lights and/or sensors may be disposed in a suitable configuration around the working channel. In embodiments, the working channel may be any suitable size, height, shape, and combinations thereof. The working channel may have a circular cross-section. In one or more embodiments, the cross-section of the working channel may be uniform along its length. In alternate embodiments, the cross-section of the working channel may vary along its length. In embodiments, the working channel may be a hollow channel running the length of the borescope 187*a*. Without limitations, the working channel may be configured to allow for a tool or component to be introduced through the handle 194 for operation at or near the distal end 190 of the borescope 187*a*. In other embodiments, the working channel may provide a flow path from a designated area near the distal end 190, through the borescope 187*a*, and to the handle 194.

In one or more embodiments, a tubular may be disposed within the working channel of the borescope 187*a*. In these embodiments, the tubular may line the interior of the length of the working channel. The tubular may be any suitable size, height, shape, and combinations thereof. The tubular may also comprise any suitable materials. Without limitations, the suitable materials may be metals, nonmetals, polymers, composites, and any combinations thereof. In one or more embodiments, heat shrinking material, such as polyolefin, may be used for the tubular. In other embodiments, polyethylene and other similar polymers may be used for the tubular. In embodiments, a piston plunger may be disposed within the tubular.

The piston plunger may comprise a piston head disposed at a distal end of the piston plunger. The piston plunger and the piston head may be any suitable size, height, shape, and combinations thereof. In one or more embodiments, the piston head may generally have the same diameter as the inner circumference of the tubular. The piston plunger and the piston head may also comprise any suitable materials. Without limitations, the suitable materials may be metals, nonmetals, polymers, composites, and any combinations thereof. In embodiments, the piston plunger may be configured to translate the piston head through and out of the tubular. During operations, a sealant (not shown) may be disposed within a distal portion of the tubular. In embodiments, the piston plunger may be operated to translate or displace the piston head towards and into the sealant to force the sealant to dispense from a distal end of the tubular. The combination of the piston plunger and the sealant may be used to seal any potential FOD into place in a designated area when an operator is not able to remove the FOD.

In one or more embodiments, the handle 194 may comprise a port, wherein the port may provide access to the working channel. In one or more embodiments, the piston plunger may be introduced into the working channel through the port. During operations, an operator may insert the distal end of the piston plunger into the port and feed the length of the piston plunger through the working channel. In embodiments, a portion of the length of the piston plunger, up to the maximum at a proximal end of the piston plunger, may be disposed into the working channel. A knob may be disposed at the proximal end of the piston plunger for use by the operator. The knob may be used to push and/or pull on the piston plunger to translate or displace the piston head an equivalent distance. Without limitations, while it is illustrated that the piston plunger may be inserted into the working channel, any other suitable tools may be used with the working channel. In embodiments, a mechanical and/or magnetic tool used to physically obtain FOD may be inserted into and through the working channel. In other embodiments, a measuring tool may be inserted into and through the working channel.

During operations, an operator may insert the piston plunger into the working channel through the port and at least partially out of the cover plate. In embodiments, the tubular may be disposed over and around at least a portion of the piston plunger. Without limitations, heat may be applied to the tubular so as to heat shrink the tubular to the piston plunger. In embodiments, any suitable method of applying heat to the tubular may be used, such as, but not limited to, a hot air gun. The operator may retract the piston plunger with the tubular back into and through the working channel so that the tubular may line at least a portion of the interior of the working channel. In one or more embodiments, a sealant may be injected into the distal end of the tubular. Without limitations, any suitable sealant may be used. In embodiments, the sealant may be thick and/or viscous. Once the sealant is disposed within a portion of the tubular, the operator may displace the piston plunger through the working channel, thereby dispensing the sealant onto any potential FOD in a designated area. In embodiments, the FOD may be completely encapsulated by the sealant and may be fixed to its present location. In other embodiments, the sealant may at least partially cover the FOD as long as it is fixed to its present location. In one or more embodiments, the operator manually actuates the piston plunger. In other embodiments, actuation of the piston plunger may be automatic through the controller 188*a*.

In one or more embodiments, a vacuum attachment may be disposed between the handle 194 and the first rotating lever 192. The vacuum attachment may be configured to couple a means of vacuuming (e.g., an air supply) to the network elements 108, wherein the network elements 108 may be capable of vacuuming any potential FOD in a designated area through the borescope 187*a*. The vacuum attachment may be any suitable size, height, shape, and combinations thereof. The vacuum attachment may also comprise any suitable materials. Without limitations, the suitable materials may be metals, nonmetals, polymers, composites, and any combinations thereof.

The vacuum attachment may comprise a port coupling, an air supply coupling, and a containment coupling. The port coupling may be configured to indirectly couple the port to the vacuum attachment. In embodiments, a conduit may be attached to both the port and the port coupling so as to couple the port to the port coupling. The port coupling may be disposed on a bottom surface of the vacuum attachment. In embodiments, the containment coupling may be disposed on a top surface of the vacuum attachment. The containment coupling may be configured to couple an external container (not shown) to the vacuum attachment, wherein the external container may receive any potential FOD being removed from a designated area with the means of vacuuming. The air supply coupling may be disposed on a side surface of the vacuum attachment. The air supply coupling may be configured to couple any suitable air supply to the network elements 108 through the vacuum attachment. In one or more embodiments, any suitable and/or standard coupling may be used for any of the port coupling, the air supply coupling, and the containment coupling. In embodiments, each of the port coupling, the air supply coupling, and the containment coupling may be disposed at any suitable location about the vacuum attachment. Without limitations, each of the port coupling, the air supply coupling, and the containment coupling may be a male or female coupling.

In one or more embodiments, the network element 108*a* may include a mobility system 195*a* configured to enable operations and/or implementation of mobility protocols and/or procedures. The mobility system 195*a* may be configured to enable movement of the chassis comprising the controller 188*a*. In the network element 108*a*, the mobility system 195*a* may comprise multiple legs configured to move, balance, and/or transport a chassis (e.g., enclosure) comprising the controller 188*a*.

As a second example, the network element 108*b* may be a removal device and/or a first inspection device configured to inspect an inspection area 112*b*. One or more of the elements and/or portions described in reference to the network element 108*a* may apply to the network element 108*b*. For example, while not explicitly labeled in FIG. 1 and/or shown, the network element 108*b* may be configured to comprise a version of the articulation system 185, the mounting system 186, the borescope 187*a*, the controller 188, the display 189, the distal end 190, the proximal end 191, the first rotating level 192, the second rotating level 193, the handle 194, and the mobility system 195*a*. The network element 108*b* may comprise machinery (e.g., a robotic arm) coupled to conveyor belt wheels. Herein, the network element 108*b*, a borescope 187*b* in the network element 108*b* may be disposed in a distal end of the robotic arm. Further, a controller 188*b* may be disposed in an enclosure coupled with the robotic arm. In the network element 108*b*, a mobility system 195*b* may comprise multiple rods and belts forming conveyor belt wheels configured to move, balance, and/or transport a chassis (e.g., enclosure) comprising the controller 188*a*.

As a third example, the network element 108*f* may be a removal device and/or a second inspection device configured to inspect the inspection area 112*b*. One or more of the elements and/or portions described in reference to the network element 108*a* may apply to the network element 108*f*. For example, while not explicitly labeled in FIG. 1 and/or shown, the network element 108*f* may be configured to comprise a version of the articulation system 185, the mounting system 186, the borescope 187*a*, the controller 188, the display 189, the distal end 190, the proximal end 191, the first rotating level 192, the second rotating level 193, the handle 194, and the mobility system 195*a*. The network element 108*f* may comprise machinery (e.g., a scanning box) that receives a conveyor belt through it. Herein, the network element 108*f*, a borescope 187*f* in the network element 108*f* may be disposed in the enclosure. Further, a controller 188*f* may be disposed in an enclosure coupled with the enclosure. In the network element 108*f*, a mobility system 195*f* may comprise multiple rods and belts forming conveyor belt configured to move, balance, and/or transport equipment towards and/or away from a chassis (e.g., enclosure) comprising the controller 188*f*.

As a fourth example, the network element 108*g* may be a removal device and/or an inspection device configured to inspect an inspection area 112*c*. One or more of the elements and/or portions described in reference to the network element 108*g* may apply to the network element 108*g*. For example, while not explicitly labeled in FIG. 1 and/or shown, the network element 108*g* may be configured to comprise a version of the articulation system 185, the mounting system 186, the borescope 187*a*, the controller 188, the display 189, the distal end 190, the proximal end 191, the first rotating level 192, the second rotating level 193, the handle 194, and the mobility system 195*a*. The network element 108*g* may comprise a communication device (e.g., a handheld device) coupled to an extendable interface (e.g., an electronic wand communicatively coupled with the handheld device). Herein, the network element 108*g*, a borescope 187*g* in the network element 108*g* may be disposed in a distal end of the extendable interface. Further, a controller 188*g* may be disposed in an enclosure coupled with the handheld device. In the network element 108*g*, a mobility system may comprise an extendable arm configured to move the network element 108*f* from a first location to a second location.

In one or more embodiments, the network elements 108 may include one or more of the components and/or elements described in reference to network elements 108*a*-108*g*. For example, a network element 108 may comprise some of the elements or components shown in reference to the network element 108*a* and the mobility system 195*b* of network element 108*b*.

Operational Flow to Dynamically Reprovision Removal Devices Configured to Initiate Foreign Object Debris (FOD) Removal Procedures FIG. 2 shows an operational flow 200 in which the system 100 of FIG. 1 is configured to initiate FOD removal procedures 166, in accordance with one or more embodiments. In FIG. 2, the operational flow 200 comprises multiple operations 202-210. The operational flow 200 may be performed by the server 102 and/or one or more entities (e.g., user devices, network components, and/or the network elements 108 among others). The operational flow 200 shows one or more collection layer operations 202, one or more anomaly prediction operations 204, one or more annotation operations 206, one or more confirmation operations 208, and one or more training generation operations 210. In some embodiments, information used as inputs and/or outputs, operational patterns, and/or device configurations associated with the operations 202-210 may be collected and used to train one or more of the AI algorithms 170 to generate one or more AI commands 168 and/or create one or more models 172.

Modifications, additions, or omissions may be made to the operational flow 200. The operational flow 200 may comprise more, fewer, or other operations than those shown in FIG. 2. For example, operations may be performed in parallel or in any suitable order. While at times discussed as the server 102, the network elements 108, or components of any of thereof performing operations described in operations 202-210 in the operational flow 200, any suitable system or components of the system 100 may perform one or more operations of the operational flow 200.

In one or more embodiments, the operational flow 200 may comprise less or more operations than those described in reference to operations 202-210. The operations 202-210 may be performed continuously and/or periodically over time.

The collection layer operations 202 may comprise collection of image data 150 from one or more sensors 211 in accordance with one or more configuration parameters 214. The one or more collection layer operations 202 may be performed in one or more inspection areas 112 and/or one or more sub-areas of a given inspection area 112. The sensors 211 may be one or more data capturing devices and/or one or more devices configured to retrieve information associated with natural phenomena. In some embodiments, the sensors 211 may be one or more optical capture devices (e.g., a camera) configured to perform capture of one or more collection operations. The conditions 212 may be natural impositions placed on equipment, the inspection area 112, and/or the sensor 211 while collecting the image data 150. For example, the conditions 212 may include one or more lighting conditions in the inspection area 112. The conditions 212 may include a position and/or orientation of the equipment at the time image data 150 is obtained. The configuration parameters 214 may be one or more configuration settings associated with the sensor 211. In this regard, a sensor 211 may be parameterized in accordance with the configuration parameters 214 to perform one or more specific collection layer operations 202. For example, one or more parameters 214 may configure a given sensor 211 to collect images in an infrared scale. Further, multiple sensors 211 may be configured in accordance with the configuration parameters 214 to collect individual image data to be composed into three-dimensional renderings by the controller 188 and/or the server processor 126. As an output, the collection layer operations 202 may be configured to generate collected data 218. The collected data 218 may be image data 150 comprising multiple actual portions 152.

In one or more embodiments, the models 172 may be configured to collect raw versions of the collected data 218 as image frames 250. The image frames 250 may comprise one or more data elements 252 referencing the conditions 212 and/or one or more of the configuration parameters 214 at a time of collection.

The anomaly prediction operations 204 may be configured to evaluate the image data 150 included in the collected data 218. The anomaly prediction operations 204 may include one or more data analyses 220 where one or more actual portions 152 in the image data 150 are evaluated for possible data anomalies 226. In this regard, the anomaly prediction operations 204 may include executing one or more trained AI algorithms 170 to evaluate individual pixels and/or groups of pixels in the collected data 218 in search of possible alterations and/or changes (e.g., discrepancies) in actual portions 152 of image data 150 over time. The collected data 218 may comprise a sequence of image frames 250 collected over a period of time. Herein, the data analyses 220 may determine timestamps associated with each image, organize the images in a sequence, and determine expected changes 222 and unexpected changes 224 in the sequence of images. In organizing the images, the anomaly prediction operations 204 may include determining static portions in the collected data 218 and separating dynamic portions in the collected data 218. The dynamic portions may be evaluated to collect discrepancies and/or modifications over time.

In the anomaly prediction operations 204, the AI algorithms 170 may be configured to compare the discrepancies and/or modifications against a dataset including possible appearances of anomalies 182 in the inspection area 112. If a change does not match possible appearance of anomalies 182, the change is categorized as an expected change 222. If a change matches possible appearance of anomalies 182, the change is categorized as an unexpected change 224.

In the anomaly prediction operations 204, the AI algorithms 170 may be configured to compare the discrepancies and/or modifications against a dataset including expected appearance of the equipment in the inspection area 112. If a change matches expected appearance of the equipment, the change is categorized as an expected change 222. If a change does not match expected appearance of the equipment, the change is categorized as an unexpected change 224.

In the unexpected change 224, the anomaly prediction operations 204 may be configured to isolate discrepancies in the collected data 218 and provide information about these discrepancies to the annotation operations 206 in the form of possible data anomalies 226. The information about the discrepancies may include a location of the discrepancies in an actual portion 152 of image data 150.

The annotation operations 206 may be configured to receive the possible data anomalies 226 from the anomaly prediction operations 204. At the annotation operations 206, one or more portions of the collected data 218 determined to include possible data anomalies 226 are tracked. One or more tracked image portions 228 may be one or more portions of collected data 218 where the possible data anomalies 226 were detected. The annotation operations 206 may include monitoring the tracked image portions 228 over the image frames 250 collected in by the sensors 211. As part of the annotation operations 206, one or more annotated data 232 may be generated. The annotated data 232 may include annotated versions of the collected data 218 in which discrepancies are labeled with a level of certainty. Herein, the labeling may be different for different possible data anomalies 226 depending on the level of certainty. The level of certainty may be higher for possible data anomalies 226 that, when tracked over time in the tracked image portions 228, show an appearance of debris in the inspection area 112. The level of certainty may be lower for possible data anomalies 226 that, when tracked over time in the tracked image portions 228, do not show an appearance of debris in the inspection area 112. If the annotation operations 206 determine that the possible data anomalies 226 indicate the occurrence of anomalies 182 in the tracked portions 228, the image frames 250 are labeled to indicate the location of the debris and a corresponding level of certainty. The debris may be determined to include FOD. If FOD is determined in the image frames 250, the anomalies 182 are labeled as detected FOD 184. If FOD is not determined in the image frames 250, the anomalies 182 are labeled as unspecified discrepancies.

The confirmation operations 208 may be configured to confirm whether one or more anomalies 182 in the tracked image portions 228 of the annotated data 232 comprise anomalies 182. The confirmation operations 208 may be configured to evaluate the annotated data 232 against one or more images representative of previous anomalies 182 found and/or expected in image data 150. Herein, a second set of image frames 250 may be collected to confirm debris in the inspection area. Further, the network element 108 may provide an input indicating visual confirmation that debris is removed following a specific removal procedure 166. The confirmation operations 208 may generate feedback 238 in the feedback generation 234. The feedback generation 234 may include determining whether the anomalies 182 are actually located in the scanned inspection area 112. The confirmation operations 208 may assign an authentication tag (e.g., label, indicator, or the like) to one or more detected anomalies 182. The confirmation operations 208 may label whether the detected anomalies 230 correspond to actual debris in the inspection area 112 based on one or more commands 240 received from the training generation operations 210. In some embodiments, the commands 240 may include receiving input from a user 114 and/or the controller 188 confirming or denying that debris is present in the inspection area 112.

The training generation operations 210 may be configured to train one or more AI algorithms 170 and/or generate and/or update one or more models 172. The training generation operations 210 may be configured to receive the feedback 238 after the confirmation operations 208 determine whether anomalies 182 were successfully detected in the collected data 218. The training generation operations 210 may include consideration of the image frames 250 captured by the sensors 211, feedback 238 received by the confirmation operations 208, collected data 218 generated by the collection layer operations 202, one or more reprovisioning windows 262, historical data 264 associated with prior anomalies identified in the inspection areas 112, one or more removal procedures 166, one or more detected anomalies 182, and/or one or more detected FOD 184.

In one or more embodiments, the training generation operations 210 may be configured to receive multiple image frames 250 including multiple data elements 252 and multiple label indicators 254. The data elements 252 may be information associated with the label indicators 254. The data elements 252 may be configured to create one or more reports in which the anomalies 182 are represented as detected FOD 184 or unspecified discrepancies.

The training generation operations 210 may comprise feedback 238 indicating that detected FOD 184 is in the image frames 250. In the training generation operations 210, the feedback 238 may be positive feedback **238*a* comprising one or more flagged portions 256*a*. The positive feedback 238*a* may include collected data 218 which was confirmed to include anomalies 182. The flagged portions 256*a* may be one or more labeled portions in the image frames 250 where the detected FOD 184 is confirmed. In the training generation operations 210, the feedback 238 may be negative feedback 238*b* comprising one or more flagged portions 256*b*. The negative feedback 238*b* may include collected data 218 which was confirmed to include not anomalies 182. The flagged portions 256*b* may be one or more labeled portions in the image frames 250 where the detected FOD 184** was expected but is not confirmed.

In one or more embodiments, the training generation operations 210 may include training of one or more AI algorithms 170 and/or creation of one or more models 172 based on of one or more detected FOD 184, historical data 264 comprising one or more patterns 266, and/or one or more removal procedures 166 by one or more neural networks 280. The neural networks 280 may comprise multiple network nodes 282. The neural networks may be one or more collection of the network nodes 282 configured to perform detailed analyses of the historical data 264, the anomalies 182, the detected FOD 184, the image frames 250, and the feedback 238. The historical data 264 may comprise appearance trends and/or patterns 266 corresponding to anomalies 182 and/or detected FOD 184 in a same inspection area 112 or multiple inspection areas 112.

In one or more embodiments, the training generation operations 210 may be one or more training operations configured to generate training data. In some embodiments, the server 102 may be configured to use AI commands 168 and AI algorithms 170 to analyze the historical data 264, the appearance patterns 266, and one or more trend values to predict future anomalies 182, ensuring optimal determination of detected FOD 184. In the training generation operations 210, the operational flow 200 comprises generation of multiple provisioning configurations 158 to reprovision one or more network elements 108. Using the provisioning configurations 158, the network elements 108 may be configured to perform one or more reprovisioned operations 103 in which the network elements 108 are configured with multiple provisioning configurations 158. The provisioning configurations 158 may be updated, created, and/or removed from the network elements 108 during one or more reprovisioning windows 262 in which the network elements 108 are expected to perform updates. The provisioning configurations 158 may be updated, created, and/or removed from the network elements 108 dynamically and outside reprovisioning windows 262 in which the network elements 108 are expected to perform updates.

In one or more embodiments, the operational flow 200 provides the technical solution of improving speed and accuracy of FOD detection in aircrafts, vehicles, vessels, machines, assemblies, manufactures, and the like (including the ability to gather, label, augment, train, test, and validate data by improving models 172). In some embodiments, the operational flow 200 is configured to provide a hardware system (e.g., network elements 108) for use in detecting FOD and/or performing a variety of inspections across a wide array of aircrafts, vehicles, vessels, machines, assemblies, manufactures, and the like. The operational flow 200 may be configured to interact and/or be used with a web-based container, mobile application, and/or reference codes to indicate particular tasks and/or operations to the server 102 and configuring the server 102 and/or the network elements 108 accordingly (e.g., choose a particular model 172, configure specific setting for the hardware of the system, and the like).

In some embodiments, the server 102 comprises an AI pipeline that efficiently creates, updates, and/or removes models 172 configured to detect and/or remove FOD in an inspection area 112.

In the collection layer operations 202, the operational flow 200 includes one or more data gathering pool operations. The data gathering pool operations may include allowing users 114 to run an FOD model 172 (e.g., such as an AI model) to find weak points in the operational analyses. The data gathering pool operations may be configured to allow users to collect image data 150 in one or more formats (e.g., video formats or picture formats). In some embodiments, the data gathering pool operations include obtaining metadata related to the image data 150.

The anomaly prediction operations 204 and/or the annotation operations 206 may comprise labelling operations using a Segment Anything Model (SAM), which is utilized to quickly allow labeling of objects in any collected image data 150.

The training generation operations 210 may include run through the image data 150 once (e.g., causing no epochs) to create training data. The training generation operations 210 may be configured to generate images including image recreations of FOD (e.g., synthetic data, such as the training samples 148.

Example Process to Dynamically Reprovision Removal Devices Configured to Initiate Foreign Object Debris (FOD) Removal Procedures FIG. 3 illustrates an example flowchart of a process 300 configured to dynamically reprovision removal devices configured to initiate FOD removal procedures, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the network elements 108, or components of any of thereof performing operations described in operations 302-336 in the process 300, any suitable system or components of the system 100 may perform one or more operations of the process 300. For example, one or more operations of the process 300 may be implemented, at least in part, in the form of instructions 132 in the memory 130 of FIG. 1, stored on non-transitory, tangible, machine-readable media (e.g., a non-transitory computer-readable medium such as memory 130 in the server 102 of FIG. 1) that when run by one or more processors (e.g., the controllers 188 in the network elements 108 of FIG. 1) may cause the one or more processors to perform operations described in operations 302-336.

The process 300 starts at operation 302, where the server 102 receives a training file 138 from training repository 134. The training file 138 may comprise at least one randomized portion 140. At operation 304, the server 102 is configured to obtain testing commands 146 configured to incorporate one or more randomized changes 142 into training file 138. In some embodiments, the server 102 may be configured to determine a performance scenario comprising a modification to the at least one additional randomized portion 140 of the additional training file 138. At operation 306, the server 102 is configured to generate training sample 148 based on training file 138 and testing commands 146. The training sample 148 may comprise a modified version of the at least one randomized portion 140 of the training file 138. At operation 308, the server 102 is configured to obtain image data 150 comprising at least a portion of an apparatus (e.g., network elements 108). The image data 150 may include at least one image portion and metadata information. At operation 310, the server 102 is configured to compare a portion of training sample 148 to the at least one image portion of image data 150.

The process 300 continues at operation 320, where the server 102 determines whether at least a portion of the training sample 148 does not match at least a portion of the image data 150. The process 300 may be configured to determine whether a modified version of the at least one randomized portion 140 at least partially matches the at least one image portion of the image data 150 within a threshold tolerance (e.g., a threshold 156). If the portion of the training sample 148 matches at least one image portion of the image data 150 (e.g., NO), the process 300 continues to operation 322. At operation 322, the server 102 may be configured to electronically pause collection of image data 150. If the portion of the training sample 148 matches at least one image portion of the image data 150 (e.g., YES), the process 300 continues to operation 332. At operation 332, the server 102 may be configured to determine a condition 212 associated with obtention of image data 150. In response to determining that the modified version of the at least one randomized portion 140 of the training sample 144 at least partially matches the at least one image portion of the image data 150 within the threshold tolerance, the process 300 determines a condition associated with obtention of the image data 150.

The process 300 may end at operation 332 and operation 334. At operation 332, the server 102 may be configured to train one or more provisioning models 172 using training sample 148, image data 150, and condition 212 associated with the obtention of the image data 150. At operation 334, the server 102 may be configured to reprovision removal devices (e.g., network elements 108) in accordance with the trained one or more provisioning models 172. Herein, the server 102 may be configured to reprovision removal devices in accordance with one or more provisioning models 172. A reprovisioned version of the removal devices may be configured to initiate a FOD removal procedure 166.

In one or more embodiments, the process 300 comprises evaluating multiple portions in a same image in the image data 150. In some embodiments, the training stack 136 may provide labeled data that is used to generate the training samples 148. The training stack 136 may be configured to output one or more image frames 250. Each image frame 250 may comprise segmented data elements in accordance with SAM models 172. Each segmented data element may comprise a label indicator 254. Each segmented data element may be associated with one or more segmented portions of a given image frame 250. In other embodiments, the training stack 136 may comprise images associated with aircrafts. The training files 138 in the training repository 134 may comprise at least a portion of a FOD and equipment associated with one or more transportation operations performed in air. The training repository 134 may comprise images associated with land vehicles. The training files 138 in the training repository 134 may comprise at least a portion of a FOD and equipment associated with one or more transportation operations performed on land. In one or more embodiments, the training repository 134 may comprise images associated with water vehicles. The training files 138 in the training repository 134 may comprise at least a portion of a FOD and equipment associated with one or more transportation operations performed on water.

In one or more embodiments, the removal devices may be configured to operate in a portable enclosure. The removal devices may be configured to operate in a stationary enclosure. The network element 108 may be connected to the server 102 in a private network that is not connected to a public network interface (e.g., the Internet). The network element 108 may be connected to the server 102 in a public network that is connected to the Internet.

Example Process to Initiate Foreign Object Debris (FOD) Removal Procedures

FIG. 4 illustrates an example flowchart of an operational flow 400 configured to initiate Foreign Object Debris (FOD) removal procedures, in accordance with one or more embodiments. In FIG. 4, the operational flow 400 comprises multiple operations 402-408. The operational flow 400 may be performed by the server 102 and one or more entities (e.g., user devices, network components, and/or the network elements 108 among others). The operational flow 400 shows one or more data structuring operations 402, one or more anomaly detection operations 404, one or more portion analysis operations 406, and one or more action generation operations 408. In some embodiments, information used as inputs and/or outputs, operational patterns, and/or device configurations associated with the operations 402-408 may be collected and used to train one or more of the AI algorithms 170 to generate one or more AI commands 168 and/or create one or more models 172.

Modifications, additions, or omissions may be made to the operational flow 400. The operational flow 400 may comprise more, fewer, or other operations than those shown in FIG. 4. For example, operations may be performed in parallel or in any suitable order. While at times discussed as the server 102, the network elements 108, or components of any of thereof performing operations described in operations 402-408 in the operational flow 400, any suitable system or components of the system 100 may perform one or more operations of the operational flow 400.

In one or more embodiments, the operational flow 400 may comprise the less or more operations than those described in reference to operations 402-408. The operations 402-408 may be performed continuously and/or periodically over time.

In one or more embodiments, the operational flow 400 illustrates the network element 108*a* configured to inspect an equipment bay 450 in the inspection area 112*a*. The equipment bay 450 may comprise multiple objects 452-458 that may be attached or detached from a main enclosure. The objects 452-458 may be one or more elements of the equipment. Herein, the objects 452-458 are representative of four possible items in the equipment bay 450. The four objects 452-458 may be debris or portions of the rest of the equipment in the equipment bay 450.

Initially, the network element 108*a* may be configured to collect one or more images using the borescope 187*a*. In some embodiments, the borescope 187*a* comprises one of the sensors 211 (referring to FIG. 2) configured as an optical capture device to collect image data 150. In some embodiments, the borescope 187*a* does not comprise the one of the sensors 211 (referring to FIG. 2). The sensors 211 may be separate from the borescope 187*a* while being configured as an optical capture device to collect image data 150. Over a time duration (e.g., a period of time of seconds or minutes), the borescope 187*a* may be used by the user 114*a* to collect images of the equipment bay 450. Upon collecting images, the collected sensor data 410 may be used to perform one or more data structuring operations 402. The collected sensor data 410 may include metadata referencing a collection area, a timestamp, and/or sensor information 412 referencing the borescope 187. The sensor information 412 may include manufacturing information of the borescope 187*a* and/or additional elements and/or components in the network element 108*a*.

The data structuring operations 402 may be configured to electronically extract the sensor information 412 from the collected sensor data 410. From the sensor information 412, the data structuring operations 402 may include performing track tunning 414 to narrow focus of the collected sensor data in a particular point of interest in the equipment bay 450. The track tunning 414 may be used to highlight, expand (e.g., perform a lose-up), and/or overall increase tracking of one or more aspects and/or perspectives of the equipment bay 450. For example, track tunning 414 may comprise modifying a scan type performed using sensors 211 in the borescope 187*a* from collecting images in grayscale to collecting infrared images.

In the data structuring operations, configuration information 415 may be extracted from the sensor information 412. The configuration information 415 may comprise one or more modifications to a collection type or a process in which the image data 150 is collected. For example, the configuration information 415 may include multiple overlays 416 configured to visually assist in the spotting, tracking, and/or monitoring of debris in the equipment bay 450. In some embodiments, the overlays 416 may comprise one or more assistance mechanisms in which tracked debris is focused-on over time. At the data structuring operations 402, one or more data streams 418 may be generated over time. The data streams 418 may comprise one or more data packets 420. The data packets 420 may include image data 150 and one or more metadata and/or collection information in accordance with one or more rules and policies.

The anomaly detection operations 404 may receive the data streams 418 from the data structuring operations 402. The anomaly detection operations 404 may include manufacturer information 424 from a manufacturer-based device, a database, and/or one or more communication devices (e.g., the databases 122) associated with equipment in the equipment bay 450. The anomaly detection operations 404 may be configured to determine expected content 426 in the data packets 420. The expected content 426 may include one or more items to be found in images of the equipment bay 450. In some embodiments, the anomaly detection operations 404 may include electronically extracting baseline information 428 associated with image data 150 comprised in the data packets 420. The baseline information 428 may include information relevant to a portion of the objects 452-458 in the equipment bay 450. For example, the image data 150 may be configured to determine whether one or more objects 452-458 include one or more anomalies 182. Herein, the collected sensor data 410 is evaluated against the baseline information in accordance with the expected content 426 and area information 430 to determine occurrence of anomalies 182. The area information 430 may be information associated with the equipment bay 450 and/or the inspection area 112*a*. For example, the area information 430 may include a lighting hue in the inspection area 112*a* at a time of collecting the collected sensor data 410. In response to detecting one or more anomalies 182 and/or possible anomalies 182 in the data streams 418, the anomaly detection operations 404 generate multiple annotated frames 432 comprising referenced objects 434*a*-434*d*. Here, each referenced object 434 is labeled along a possible identifier. For example, the referenced object 434*a* may be labeled as a possible anomaly 182 while the referenced objects 434*b*-434*c* may be referenced as including portions of the equipment in the equipment bay 450.

The portion analysis operations 406 may receive the annotated frames 432 comprising the referenced objects 434*a*-434*d*. Herein, the operational flow 400 comprises determining one or more static portions 436 and one or more dynamic portions 438 in the annotated frames 432. The static portions 436 may include multiple portions of the images in the collected sensor data 410 in which movement is not detected over time. The dynamic portions 438 may include multiple portions of the images in the collected sensor data 410 in which movement is detected over time. A combination of possible anomalies 182 in a static portion 436 may be flagged as a location of interest or a point of interest in the annotated frame 432. The flagged frame portions 440 may be provided to the action generation operations 408.

The action generation operations 408 may be operations were detected FOD 184 is determined in the collected flagged frame portions 440 due to specific movement (or lack thereof) associated with a potential anomaly 182 (e.g., one of the referenced objects 434). The action generation operations 408 may comprise operations performed by a labeling tool 442 configured to assign labeling to one or more specific FOD determined in the flagged frame portions 440. The action generation operations 408 may comprise operations performed by a gathering tool 444 configured to determine approaches and/or procedures for collecting the images of the equipment bay 450 as collected sensor data 410. In response to determining the detected FOD 184, the operational flow 400 includes determining and performing one or more removal procedures 166 in which the detected FOD 184 is removed from the equipment bay 450. In one or more embodiments, the network element 108 is configured to generate one or more visual reports 446 displaying one or more detected FOD 184 in the static portions 436 of the annotated frames 432.

In one or more embodiments, the operational flow 400 provides the technical solution of improving speed and accuracy of FOD detection in aircrafts, vehicles, vessels, machines, assemblies, manufactures, and the like (including the ability to gather, label, augment, train, test, and validate data by improving models 172). In some embodiments, the operational flow 400 includes a network element 108*a* including an extendable rod or wand and a cart comprising the controller 188. In some embodiments, the sensors 211 may be a high-contrast camera, with a resolution usable for a particular AI training. The network element 108*a* may comprise an actuatable button for user-control of lighting, power, and/or operation of the sensors 211. The actuatable buttons for user-control may be configured to indicate whether the FOD detection is accurate, which improves the feedback 238 and quality of FOD detection operations. The network element 108*a* may comprise a telescoping and flexible wand, facilitating hand-held user inspection in small, difficult, and/or hard-to-reach areas. The network element 108*a* may include a filter and a vacuum that enables identification and retrieval of FOD.

In one or more embodiments, the network elements 108*a* may be configured to communicate wirelessly. The network element 108*a* may comprise an enclosure and/or chassis configured to contain electronic in a portable system that is resistant to explosive, water, and/or pressure in electronic elements and/or components. The enclosure and/or chassis may be configured to be explosive rated, or spark free, and reliable to operate in fuel-heavy environments. As an example, the enclosures may be rated in accordance with the National Electrical Code (NEC) classification systems, which comprises zones that are defined by presence of gas or dust and the likelihood of ignition. The NEC has six hazard levels for each material (Zones 0-2, 20-22) and the division system has two levels for all materials. Herein, the enclosures may be rated for Class I, Class II, and/or Class III, with Division 1 or Division 2.

Example Process to Initiate Foreign Object Debris (FOD) Removal Procedures

FIG. 5 illustrates an example flowchart of a process 500 configured to initiate Foreign Object Debris (FOD) removal procedures, in accordance with one or more embodiments. Modifications, additions, or omissions may be made to the process 500. The process 500 may comprise more, fewer, or other operations than those shown in FIG. 5. For example, operations may be performed in parallel or in any suitable order. While at times discussed as the server 102, the network elements 108, or components of any of thereof performing operations described in operations 502-538 in the process 500, any suitable system or components of the system 100 may perform one or more operations of the process 500. For example, one or more operations of the process 500 may be implemented, at least in part, in the form of instructions 132 in the memory 130 of FIG. 1, stored on non-transitory, tangible, machine-readable media (e.g., a non-transitory computer-readable medium such as memory 130 in the server 102 of FIG. 1) that when run by one or more processors (e.g., the controllers 188 in the network elements 108 of FIG. 1) may cause the one or more processors to perform operations described in operations 502-538.

The process 500 starts at operation 502, where the network element 108 obtain image data stream 418 from a sensor 211. The image data stream 418 may comprise one or more image frames 432 representative of a portion of the apparatus (e.g., equipment in the equipment bay 450). At operation 504, the network element 108 may be configured to receive manufacture information 424 of an apparatus at least partially shown in the image data 150. At operation 506, the network element 108 may be configured to electronically associate expected content 426 of the apparatus based on the manufacture information 424. In response to receiving the manufacture information 424 of the apparatus, the network element 108 may be configured to electronically associate expected content 426 of the portion of the apparatus based at least in part upon the manufacture information 424. At operation 508, the server 102 is configured to determine baseline information 428 from image data stream 418. The baseline information 428 may be representative of a plurality of static portions 436 in the image data stream 418.

The process 500 continues at operation 510, where the network element 108 may be configured to determine whether the baseline information 428 comprises expected content 426 within a threshold tolerance (e.g., a threshold 156). If the baseline information 428 does not comprise expected content 426 within the threshold tolerance (e.g., NO), the process 500 continues to operation 512. If the baseline information 428 does not comprise expected content 426 within the threshold tolerance (e.g., YES), the process 500 continues to operation 522. At operation 522, the server 102 may be configured to flag baseline information 428 as comprising at least one anomaly 182. In response to determining that the baseline information 428 does not comprise the expected content 426 within the threshold tolerance, the network element 108 is configured to flag the baseline information 428 as comprising at least one anomaly 182. At operation 524, the server 102 may be configured to electronically extract image data 150 representative of at least one anomaly 182 from the baseline information 428. At operation 526, the server 102 may be configured to compare image data 150 representative of at least one anomaly 182 to acceptable modifications to expected content 426. In some embodiments, the server 102 may be configured to preprocess the image data stream 418, process each image in the image data stream 418, and evaluate each image using an artificial intelligence (AI) model. In these embodiments, the server 102 may be configured to provide evaluation results to an administrator and/or additional hardware components for review.

The process 500 further continues at operation 530, where the server 102 determines whether the image data 150 matches at least one acceptable modification. If the image data 150 does not match at least one acceptable modification (e.g., NO), the process 500 continues to operation 512. If the image data 150 matches at least one acceptable modification (e.g., YES), the process 500 continues to operation 532. At operation 532, the server 102 may be configured to flag at least one anomaly 182 as an FOD. In response to determining that the image data 150 representative of the at least one anomaly 182 does not match at least one of the acceptable modifications to the expected content 426, flag at least one anomaly 182 as an FOD. At operation 534, the server 102 may be configured to generate a visual report 446 comprising at least one anomaly identified in one or more image frames representative of the portion of the apparatus. At operation 536, the server 102 may be configured to present visual report 446 and one or more FOD removal procedures 166.

The process 500 may end at operation 512 or operation 538. At operation 512, the server 102 may be configured to flag baseline information 428 as not comprising at least one anomaly 182. At operation 538, the server 102 may be configured to initiate an FOD removal procedure 166 of one or more FOD removal procedures 166 configured to remove FOD from portion of the apparatus.

In one or more embodiments, the network element **108*a* may be configured to perform additional iteration of the process 500 to confirm whether the inspection area 112 is free of debris. The sensor 211 may comprise a high-contrast camera configurable to capture image data types at one or more image resolutions. The network element 108*a* may comprise a telescoping light-weight rod comprising a first end and a second end, where the telescoping light-weight rod is configured to modify the first end and the second end between a first position and a second position. The first position may cause the rod to have a first length. The second position may cause the rod to have a second length. The first length may be longer than the second length. The second length may be longer than the first length. The first end may be closer to the second end in the first position than in the second position. The sensor 211 may be embedded in the first end of the telescoping light-weight rod. The network element 108*a* may comprise a borescope 187*a*, where multiple optical fibers are disposed within the borescope 187*a*, a mounting system 186; an articulation system 185; and a controller structure (e.g., a controller 188*a*). The controller 188*a* may comprise a structure (e.g., encased in an enclosure) may comprises a display 189, where a proximal end 191 of the borescope 187*a* is coupled to the mounting system 186. The mounting system 186 may be configured to secure the network element 108*a* to an external surface. The mounting system 186 may be coupled to the articulation system 185. The mounting system 186 may be configured to hold and/or maintain the display 189 in a predefined position and/or distance from a mounting surface. In this embodiment, the mounting system 186 does not secure the borescope 187*a*. The articulation system 185 may be configured to actuate the borescope 187*a*. The articulation system 185 may be communicatively coupled to the controller structure. The mounting system 186 may be operable to move around the portion of the apparatus. The network element 108*a*** may comprise an air control attachment comprising a port coupling, an air supply coupling, and a containment coupling.

Scope of the Disclosure

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system, comprising:

a sensor configured to collect data associated with one or more portions of an apparatus; and at least one processor communicatively coupled to the sensor and configured to:

obtain an image data stream from the sensor, the image data stream comprising one or more image frames representative of a portion of the apparatus;

receive manufacture information of the apparatus;

in response to receiving the manufacture information of the apparatus, electronically associate expected content of the portion of the apparatus based at least in part upon the manufacture information;

determine baseline information from the image data stream, the baseline information being representative of a plurality of static portions in the image data stream;

determine whether the baseline information comprises the expected content within a threshold tolerance;

in response to determining that the baseline information does not comprise the expected content within the threshold tolerance, flag the baseline information as comprising at least one anomaly;

electronically extract image data representative of the at least one anomaly from the baseline information;

compare the image data representative of the at least one anomaly to a plurality of acceptable modifications to the expected content;

determine whether the image data representative of the at least one anomaly matches at least one of the plurality of acceptable modifications to the expected content;

in response to determining that the image data representative of the at least one anomaly does not match at least one of the plurality of acceptable modifications to the expected content, flag at least one anomaly as a Foreign Object Debris (FOD);

generate a visual report comprising the at least one anomaly identified in the one or more image frames representative of the portion of the apparatus;

present the visual report and one or more FOD removal procedures; and initiate an FOD removal procedure of the one or more FOD removal procedures configured to remove the FOD from the portion of the apparatus.

2. The system of claim 1, wherein the at least one processor is further configured to:

complete the FOD removal procedure within a predefined time duration;

obtain an additional image data stream from the sensor, the additional image data stream comprising one or more additional image frames representative of an additional portion of the apparatus;

determine additional baseline information from the image data stream, the additional baseline information being representative of an additional plurality of static portions in the additional image data stream;

determine whether the additional baseline information comprises the expected content within the threshold tolerance; and in response to determining that the additional baseline information comprises the expected content within the threshold tolerance, flag the additional baseline information as not comprise the at least one anomaly.

3. The system of claim 1, wherein:

the sensor comprises a high-contrast camera configurable to capture a plurality of image data types at one or more image resolutions.

4. The system of claim 1, further comprising a telescoping light-weight rod comprising a first end and a second end, wherein:

the telescoping light-weight rod is configured to modify the first end and the second end between a first position and a second position;

the first end is closer to the second end in the first position than in the second position; and the sensor is embedded in the first end of the telescoping light-weight rod.

5. The system of claim 1, further comprising:

a borescope, wherein a plurality of optical fibers is disposed within the borescope;

a mounting system;

an articulation system; and a controller structure, wherein:

a display is coupled to the mounting system;

the mounting system is configured to secure the display to an external surface;

the mounting system is coupled to the articulation system; and the articulation system is communicatively coupled to the controller structure.

6. The system of claim 5, wherein:

the mounting system is operable to move around the portion of the apparatus.

7. The system of claim 1, further comprising an air control attachment comprising:

a port coupling;

an air supply coupling; and a containment coupling.

8. The system of claim 1, wherein:

the system is operable in a hazardous environment.

9. A method, comprising:

obtaining an image data stream from a sensor, the image data stream comprising one or more image frames representative of a portion of an apparatus;

receiving manufacture information of the apparatus;

in response to receiving the manufacture information of the apparatus, electronically associating expected content of the portion of the apparatus based at least in part upon the manufacture information;

determining baseline information from the image data stream, the baseline information being representative of a plurality of static portions in the image data stream;

determining whether the baseline information comprises the expected content within a threshold tolerance;

in response to determining that the baseline information does not comprise the expected content within the threshold tolerance, flagging the baseline information as comprising at least one anomaly;

electronically extracting image data representative of the at least one anomaly from the baseline information;

comparing the image data representative of the at least one anomaly to a plurality of acceptable modifications to the expected content;

determining whether the image data representative of the at least one anomaly matches at least one of the plurality of acceptable modifications to the expected content;

in response to determining that the image data representative of the at least one anomaly does not match at least one of the plurality of acceptable modifications to the expected content, flagging at least one anomaly as a Foreign Object Debris (FOD);

generating a visual report comprising the at least one anomaly identified in the one or more image frames representative of the portion of the apparatus;

presenting the visual report and one or more FOD removal procedures; and initiating an FOD removal procedure of the one or more FOD removal procedures configured to remove the FOD from the portion of the apparatus.

10. The method of claim 9, further comprising:

completing the FOD removal procedure within a predefined time duration;

obtaining an additional image data stream from the sensor, the additional image data stream comprising one or more additional image frames representative of an additional portion of the apparatus;

determining additional baseline information from the image data stream, the additional baseline information being representative of an additional plurality of static portions in the additional image data stream;

determining whether the additional baseline information comprises the expected content within the threshold tolerance; and in response to determining that the additional baseline information comprises the expected content within the threshold tolerance, flagging the additional baseline information as not comprise the at least one anomaly.

11. The method of claim 9, wherein:

the sensor comprises a high-contrast camera configurable to capture a plurality of image data types at one or more image resolutions.

12. The method of claim 9, wherein:

the sensor is operably coupled with a telescoping light-weight rod comprising a first end and a second end;

the telescoping light-weight rod is configured to modify the first end and the second end between a first position and a second position;

the first end is closer to the second end in the first position than in the second position; and the sensor is embedded in the first end of the telescoping light-weight rod.

13. The method of claim 9, wherein:

the sensor is operably coupled with a borescope;

a plurality of optical fibers is disposed within the borescope;

the sensor is further operably coupled with:

a mounting system;

an articulation system; and a controller structure, wherein:

a display is coupled to the mounting system;

the mounting system is configured to secure the display to an external surface;

the mounting system is coupled to the articulation system; and the articulation system is communicatively coupled to the controller structure.

14. The method of claim 13, wherein:

the mounting system is operable to move around the portion of the apparatus.

15. The method of claim 9, wherein:

the sensor is operably coupled with an air control attachment comprising:

a port coupling;

an air supply coupling; and a containment coupling.

16. A non-transitory computer-readable medium storing instructions that when executed by a processor cause the processor to:

obtain an image data stream from a sensor, the image data stream comprising one or more image frames representative of a portion of an apparatus;

receive manufacture information of the apparatus;

in response to receiving the manufacture information of the apparatus, electronically associate expected content of the portion of the apparatus based at least in part upon the manufacture information;

determine baseline information from the image data stream, the baseline information being representative of a plurality of static portions in the image data stream;

determine whether the baseline information comprises the expected content within a threshold tolerance;

in response to determining that the baseline information does not comprise the expected content within the threshold tolerance, flag the baseline information as comprising at least one anomaly;

electronically extract image data representative of the at least one anomaly from the baseline information;

compare the image data representative of the at least one anomaly to a plurality of acceptable modifications to the expected content;

determine whether the image data representative of the at least one anomaly matches at least one of the plurality of acceptable modifications to the expected content;

in response to determining that the image data representative of the at least one anomaly does not match at least one of the plurality of acceptable modifications to the expected content, flag at least one anomaly as a Foreign Object Debris (FOD);

generate a visual report comprising the at least one anomaly identified in the one or more image frames representative of the portion of the apparatus;

present the visual report and one or more FOD removal procedures; and initiate an FOD removal procedure of the one or more FOD removal procedures configured to remove the FOD from the portion of the apparatus.

17. The non-transitory computer-readable medium of claim 16, wherein, when executed by the processor, the instructions further cause the processor to:

complete the FOD removal procedure within a predefined time duration;

obtain an additional image data stream from the sensor, the additional image data stream comprising one or more additional image frames representative of an additional portion of the apparatus;

determine additional baseline information from the image data stream, the additional baseline information being representative of an additional plurality of static portions in the additional image data stream;

determine whether the additional baseline information comprises the expected content within the threshold tolerance; and in response to determining that the additional baseline information comprises the expected content within the threshold tolerance, flag the additional baseline information as not comprise the at least one anomaly.

18. The non-transitory computer-readable medium of claim 16, wherein:

the sensor comprises a high-contrast camera configurable to capture a plurality of image data types at one or more image resolutions.

19. The non-transitory computer-readable medium of claim 16, wherein:

the sensor is operably coupled with a telescoping light-weight rod comprising a first end and a second end;

the telescoping light-weight rod is configured to modify the first end and the second end between a first position and a second position;

the first end is closer to the second end in the first position than in the second position; and the sensor is embedded in the first end of the telescoping light-weight rod.

20. The non-transitory computer-readable medium of claim 16, wherein:

the sensor is operably coupled with a borescope;

a plurality of optical fibers is disposed within the borescope;

the sensor is further operably coupled with:

a mounting system;

an articulation system; and a controller structure, wherein:

a display is coupled to the mounting system;

the mounting system is configured to secure the display to an external surface;

the mounting system is coupled to the articulation system; and the articulation system is communicatively coupled to the controller structure.

* * * * *